US012746839B2

(12) United States Patent
Moon

(10) Patent No.: US 12,746,839 B2
(45) Date of Patent: Sep. 29, 2026

(54) SMART BATTERY BASED ELECTRIC VEHICLE CHARGING SYSTEM WITH MULTIPLE INPUT PORTS AND MULTIPLE OUTPUT PORTS

(71) Applicant: Sung Ub Moon, Richmond (CA)

(72) Inventor: Sung Ub Moon, Richmond (CA)

(73) Assignee: Sung Ub Moon, Richmond (CA)

( * ) Notice: Subject to any disclaimer, the term of this patent is extended or adjusted under 35 U.S.C. 154(b) by 0 days.

(21) Appl. No.: 18/705,270

(22) PCT Filed: Jul. 13, 2023

(86) PCT No.: PCT/CA2023/050945
§ 371 (c)(1),
(2) Date: Apr. 26, 2024

(87) PCT Pub. No.: WO2024/011326
PCT Pub. Date: Jan. 18, 2024

(65) Prior Publication Data

US 2025/0128628 A1 Apr. 24, 2025

Related U.S. Application Data

(60) Provisional application No. 63/389,255, filed on Jul. 14, 2022.

(51) Int. Cl.
*B60L 53/53* (2019.01)
*B60L 53/10* (2019.01)
(Continued)

(52) U.S. Cl.
CPC ............... *B60L 53/53* (2019.02); *B60L 53/11* (2019.02); *B60L 53/305* (2019.02); *B60L 53/63* (2019.02); *B60L 53/65* (2019.02)

(58) Field of Classification Search
CPC ........................................................ B60L 53/53
(Continued)

(56) References Cited

U.S. PATENT DOCUMENTS 8,872,379 B2 * 10/2014 Ruiz ....................... B60L 1/003 307/66
2012/0299544 A1 * 11/2012 Prosser ................... H02J 7/342 320/109
(Continued)

OTHER PUBLICATIONS

International Search Report and Written Opinion of International Application No. PCT/CA2023/050945 dated Oct. 18, 2023.

*Primary Examiner* — Jerry D Robbins
(74) *Attorney, Agent, or Firm* — Norton Rose Fulbright Canada LLP; Maya Medeiros

(57) ABSTRACT

Embodiments described herein provide smart battery based electric vehicle charging systems with multiple input ports and multiple output ports. The system is flexible and adaptable for different EV charging and battery technologies. Embodiments described herein provide smart mobile or stationary battery based electric vehicle charging systems with multiple input ports and multiple output ports. The system is flexible and adaptable for different EV charging and battery technologies. The system can be a mobile battery based electric vehicle charging systems with multiple input ports and multiple output ports in some embodiments. The system can be a stationary battery based electric vehicle charging systems with multiple input ports and multiple output ports in other embodiments. The system that is stationary can be fixed at a specific location, such as an EV charging facility, a commercial complex EV charging centre, a residential property, or other location.

26 Claims, 26 Drawing Sheets

Power Switching Matrix

(51) Int. Cl.
*B60L 53/30* (2019.01)
*B60L 53/63* (2019.01)
*B60L 53/65* (2019.01)

(58) Field of Classification Search
USPC .......................................................... 320/109
See application file for complete search history.

(56) References Cited

U.S. PATENT DOCUMENTS

| | | | | |
|---|---|---|---|---|
| 2014/0266004 | A1* | 9/2014 | Andrews, Jr. | B60L 58/12<br>320/108 |
| 2015/0171632 | A1* | 6/2015 | Fry | H02J 7/0047<br>307/22 |
| 2016/0043555 | A1* | 2/2016 | Howell | H02J 7/0068<br>307/23 |
| 2018/0264955 | A1* | 9/2018 | Gupta | G06Q 30/0283 |
| 2019/0245356 | A1* | 8/2019 | Moon | H01M 10/488 |
| 2021/0031638 | A1* | 2/2021 | Lehmeier | B60L 53/11 |
| 2021/0291694 | A1* | 9/2021 | Shaaban | B60L 53/67 |
| 2021/0354578 | A1* | 11/2021 | Kirschner | B60L 53/11 |
| 2022/0115877 | A1 | 4/2022 | Stanfield et al. | |
| 2022/0281346 | A1* | 9/2022 | Green | B60L 53/67 |
| 2024/0042874 | A1* | 2/2024 | Pollica | B60L 53/51 |

* cited by examiner

EV Charging System

EV Charging System

Side view

Main Control System Board

Battery Connection of Main Battery Control Board

Main Control System Board and Other Boards

Connection of Multiple Battery Modules Inside Battery Pack

Connection of Multiple Battery Modules and Increase the Voltage

Connection of Multiple Battery Packs Through External Connectors

Rear view

Automatic Adjustment of Power Distribution to Output Ports

Automatic Control of Battery Pack Discharging

Connection of Multiple Electric Vehicle

Connection of Electric Vehicle with Charging Capacity or Higher Voltage

Wireless Communication Board

Stationary Battery Based Commercial EV Charging Facility

Stationary Battery Based Commercial EV Charging Centre

Stationary Battery Based Residential EV Charging System

Stationary Battery Based Commercial EV Charging Station

Stationary Residential EV Charging Station

SMART BATTERY BASED ELECTRIC VEHICLE CHARGING SYSTEM WITH MULTIPLE INPUT PORTS AND MULTIPLE OUTPUT PORTS

FIELD

The improvements generally relate to the field of energy storage systems, and, in particular, the improvements generally relate to the field of energy storage systems with batteries for charging electric vehicles.

INTRODUCTION

Energy storage systems are useful for charging electric vehicles (EVs). The prevalence of and society's dependence on EVs is growing which in turn creates an increasing need for EV chargers.

Energy storage systems have energy storage elements such as batteries or battery packs. Each battery or battery pack may have one or more battery modules, and each battery module may have one or more battery cell. Battery charging may be optimized at the battery pack level, the battery module level, or the battery cell level, depending on the connection access available at each of these levels. There exists a need for energy storage systems with flexibility for charging and discharging batteries.

Energy storage systems can be stationary or mobile. There exists a need for mobile or portable energy storage systems. Mobile or portable charging systems with batteries may provide advantages such as increased charging rate, less cost, more efficiency and so on.

There also exists a need for stationary energy storage systems that may provide advantages such as increased charging rates, less cost, and more efficiency.

Stationary EV charging systems designed for residential housing generally connect to 120 volt electrical connections (Level 1 charging) or 208 volt to 240 volt electrical connections (Level 2 charging) already available at the property. Level 1 chargers generally take 8 to 36 hours to fully charge (from empty to full) a single EV depending on the size of the EV battery pack. Level 2 chargers generally take 4 to 21 hours to fully charge a single EV depending on the size of the EV battery pack and the current rating of the electrical connection to the property from the electrical grid. Both Level 1 and Level 2 chargers take a long time to fully charge an EV. When compared to vehicles with internal combustion engines which can be fully filled at a refuelling facility in a few minutes, Level 1 and Level 2 chargers may not be feasible for fast charging at commercial charging facilities.

If fast charging is desired either at commercial or residential facilities, a fast DC charging system (Level 3) is required. Level 3 chargers can fully charge a single EV in 10 minutes to 1 hour. These charging times may decrease further as DC fast charging technologies improve. However, installing level 3 charging systems requires 3-phase power connections at the charging location. Installing 3-phase power is very costly and not practical or even feasible in some cases. As such, there exists a need for EV charging stations with integrated battery packs or other energy storage devices which may be fully charged over a long period of time (such as overnight) and then able to fast charge EVs quickly from the stored energy.

Stationary charging systems with batteries may provide advantages such as increased charging rate, less cost, less installation cost, more efficiency and so on.

Accordingly, for mobile and stationary EV charger systems, there is a need for multiple input (charging) mechanisms, and multiple output (discharging from battery and charging to EV) mechanisms to provide flexibility and adaptability for different EV charging and battery technologies.

Further, EV charger technology and protocol changes, and also the battery technology changes. For example, EV charger technology changes to meet different EV drivers' requirements, such as different types of EV charging ports (including but not limited to CCS Types 1 and 2, CHAdeMo, Tesla, J1772, GB/T, and IEC 62196 Type 2), and different types of mobile EV Charger battery charging methods (including but not limited to AC 110V, AC 208V to 240V, and DC 400V to 900V) These changes create challenges for systems with EV charger technology and battery technology.

Accordingly, there is a need for EV charger systems with multiple input (charging) mechanisms, and multiple output (discharging from battery and charging to EV) mechanisms to provide flexibility and adaptability for different EV charging and battery technologies.

SUMMARY

Embodiments described herein provide smart battery based electric vehicle charging systems with multiple input ports and multiple output ports. Some embodiments described herein provide mobile battery based electric vehicle charging systems with multiple input ports and multiple output ports. Other embodiments described herein provide stationary battery based electric vehicle charging systems with multiple input ports and multiple output ports.

In accordance with an aspect, there is provided a battery electric vehicle (EV) charging system. The system has a plurality of input charging ports connectable to receive electrical power from one or more energy sources, wherein the plurality of input ports comprise different types of input ports; a plurality of output discharging ports connectable to deliver electrical power to one or more loads, wherein the plurality of output ports comprise different types of output ports; a plurality of battery packs to receive input electrical power from the plurality of input charging ports and provide output electrical power to the plurality of output discharging ports; a main control system board connected between the plurality of battery packs and the plurality of inputs, and between the plurality of battery packs and the plurality of outputs, the main control system board configured to selectively connect each battery pack to any number of the plurality of input ports or any number of the plurality of output ports, each input port to any number of battery packs, and each output port to any number of battery packs; a main battery control board for controlling connections between each battery pack and any number of the plurality of input ports or any number of the plurality of output ports, wherein the main control system board controls the main battery control board to separately control charging of the battery packs and discharging of the battery packs; and a battery management system board, if present, that monitors the battery status for the battery packs and limits discharging of the battery packs for charging the loads based on battery pack parameters (such as remaining charge percentage and capacity) and status of the battery packs. If the battery management system board is not present, the main control system board and main battery control board can control the charging and discharging of the battery packs and battery modules depending on the connection configuration.

In accordance with an aspect, there is provided a mobile battery EV charging system.

The mobile battery electric vehicle (EV) charging system can have a plurality of input charging ports connectable to receive electrical power from one or more energy sources, wherein the plurality of input ports comprise different types of input ports; a plurality of output discharging ports connectable to deliver electrical power to one or more loads, wherein the plurality of output ports comprise different types of output ports; a plurality of battery packs to receive input electrical power from the plurality of input charging ports and provide output electrical power to the plurality of output discharging ports; a main control system board connected between the plurality of battery packs and the plurality of inputs, and between the plurality of battery packs and the plurality of outputs, the main control system board configured to selectively connect each battery pack to any number of the plurality of input ports or any number of the plurality of output ports, each input port to any number of battery packs, and each output port to any number of battery packs; a main battery control board for controlling connections between each battery pack and any number of the plurality of input ports or any number of the plurality of output ports, wherein the main control system board controls the main battery control board to separately control charging of the battery packs and discharging of the battery packs; and a battery management system board, if present, that monitors the battery status for the battery packs and limits discharging of the battery packs for charging the loads based on battery pack parameters (such as remaining charge percentage and capacity) and status of the battery packs. If the battery management system board is not present, the main control system board and main battery control board can control the charging and discharging of the battery packs and battery modules depending on the connection configuration.

In accordance with another aspect, there is provided a stationary battery EV charging system.

The stationary electric vehicle (EV) charging system can have a plurality of input charging ports connectable to receive electrical power from one or more energy sources, wherein the plurality of input ports comprise different types of input ports; a plurality of output discharging ports connectable to deliver electrical power to one or more loads, wherein the plurality of output ports comprise different types of output ports; a plurality of battery packs to receive input electrical power from the plurality of input charging ports and provide output electrical power to the plurality of output discharging ports; a main control system board connected between the plurality of battery packs and the plurality of inputs, and between the plurality of battery packs and the plurality of outputs, the main control system board configured to selectively connect each battery pack to any number of the plurality of input ports or any number of the plurality of output ports, each input port to any number of battery packs, and each output port to any number of battery packs; a main battery control board for controlling connections between each battery pack and any number of the plurality of input ports or any number of the plurality of output ports, wherein the main control system board controls the main battery control board to separately control charging of the battery packs and discharging of the battery packs; and a battery management system board, if present, that monitors the battery status for the battery packs and limits discharging of the battery packs for charging the loads based on battery pack parameters (such as remaining charge percentage and capacity) and status of the battery packs. If the battery management system board is not present, the main control system board and main battery control board control the charging and discharging of the battery packs and battery modules depending on the connection configuration.

Many further features and combinations thereof concerning embodiments described herein will appear to those skilled in the art following a reading of the instant disclosure.

DESCRIPTION OF THE FIGURES

In the figures.

DETAILED DESCRIPTION

Embodiments described herein relate to smart battery based electric vehicle (EV) charging system with multiple input ports and multiple output ports. Some embodiments described herein relate to smart mobile battery based EV charging system with multiple input ports and multiple output ports. Further embodiments described herein relate to a stationary battery based electric vehicle charging system with multiple input ports and multiple output ports.

These embodiments may also be used in other applications which include but are not limited to backup power systems for residences and commercial infrastructure, emergency power for critical services, remote power in areas where no power grid or power infrastructure is present, additional power for recreational and marine vehicles, off-grid power for street lighting, and portable power for any application that requires it.

Figure 1A:
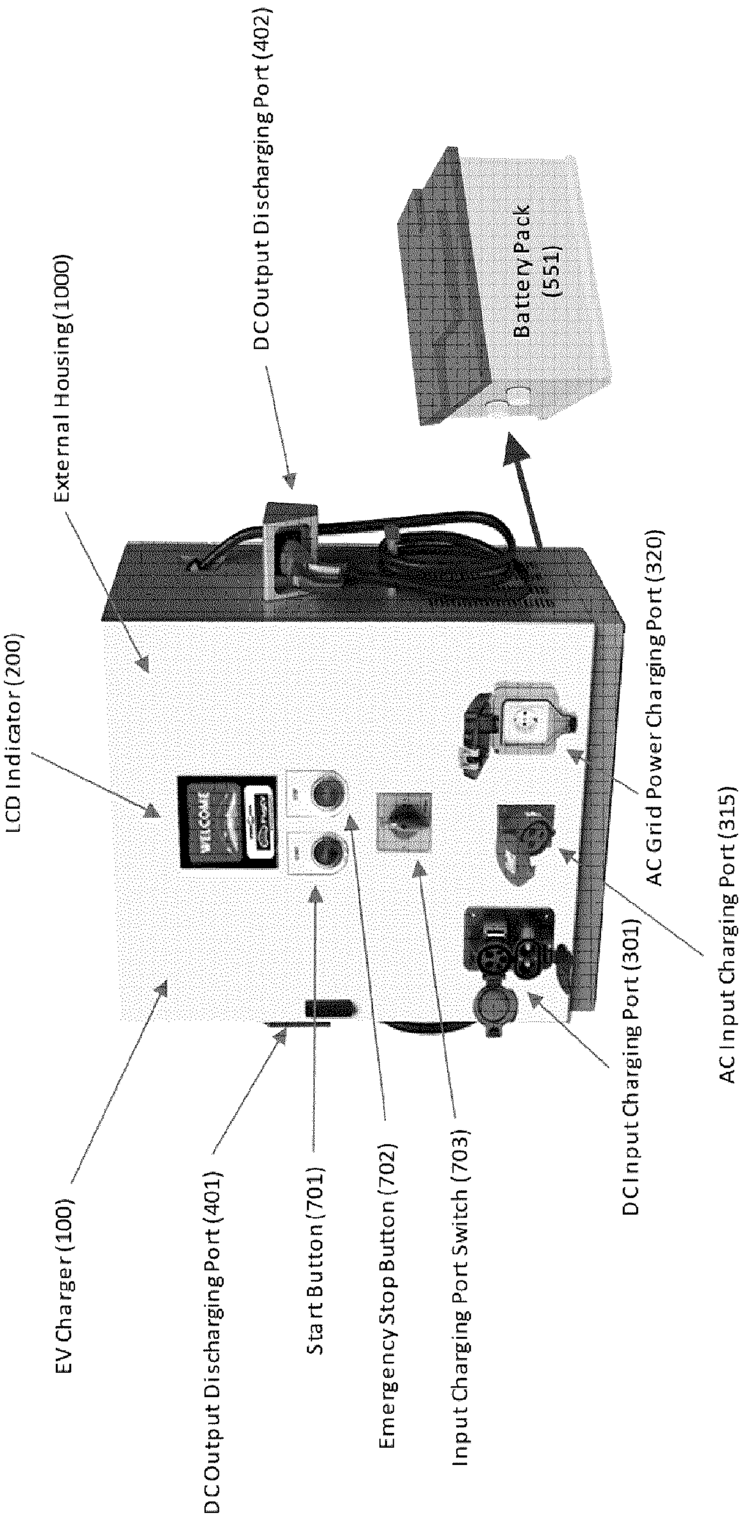
FIG. 1A shows an example smart battery based electric vehicle charging system with multiple input ports and multiple output ports.

FIG. 1A shows an example smart battery based electric vehicle (EV) charging system with multiple input ports and multiple output ports. The system has an EV charger 100 contained within an external housing 1000. The EV charger 100 can be mobile and movable to a plurality of locations, or stationary and fixed at a location, for example.

The EV charger 100 may have selectable switches, such as input charging port switch 703, that establish the connection between components for charging and discharging, and/or may have remote control internal switches controlled via an external wireless remote control, an app on a personal handled device (PDA) connected wirelessly, or a network connection (wired or wireless) from an external computer or similar network device. The EV charger 100 has the capability to enable automatic charging and discharging.

The EV charger 100 has a plurality of input ports connectable to receive electrical power from one or more energy sources. For example, the input ports may include a DC input charging port 301, an AC input charging port 315, AC grid power charging port 320. The EV charger 100 has an input charging port switch 703 that is connected to the main control system board 110, as shown in FIG. 6B. The DC charging port may receive power from solar power system outputs, wind powered system outputs, external battery packs or battery storage banks, other EVs with excess battery capacity, tidal power systems, hydroelectric power systems, mechanically powered electrical generators, internal combustion engines/generators, and any other DC power source.

The EV charger 100 has a plurality of output ports connectable to deliver electrical power to one or more loads, such as EVs. For example, the output ports may include DC output discharging port 401, and DC output discharging port 402. The discharging ports may be configured to charge additional devices other than EVs including but not limited to PDAs, battery operated electrical tools, backup battery systems, uninterruptable power supplies (UPSs), and any other battery powered device that is chargeable.

Figure 4A:
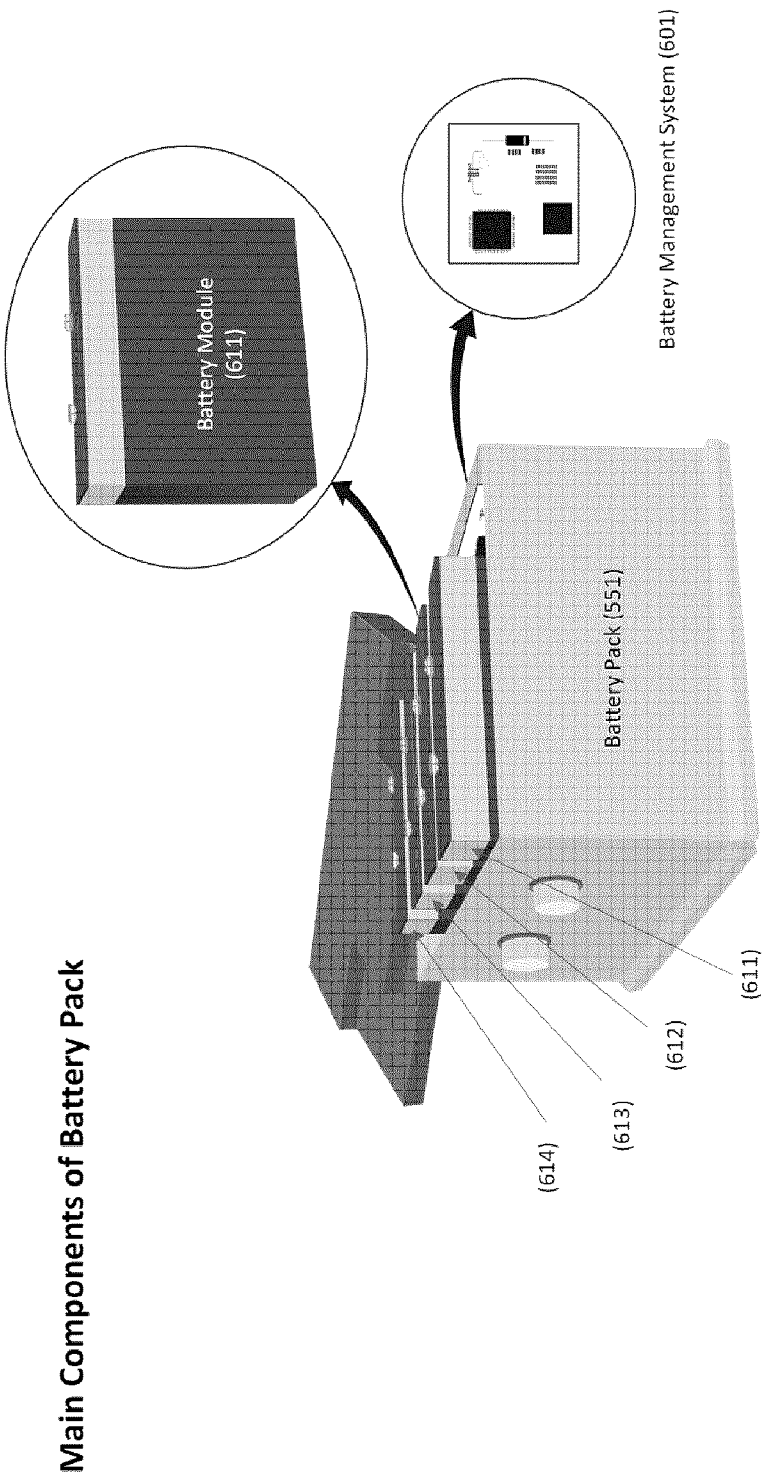
FIG. 4A shows an example battery pack containing battery modules.

The EV charger 100 has a plurality of battery packs 551 which each contains one or a plurality of battery modules 611 to 614, as shown in FIG. 4A. In some embodiments, the battery pack(s) may be omitted and the battery modules may be connected to directly to the system. In other embodiments, the battery module(s) may be omitted and battery cells may be connected directly to the system. The EV charger 100 may have a fixed or variable discharging voltage or the maximum discharging voltage may be increased by combining the voltage of multiple battery packs. Discharging refers to the EV charger 100 providing output electrical power to the load, such as an EV, specifically the energy storage system of the EV, which may consist of one or more battery packs or battery modules. The battery packs may be added to the inside of the enclosure or externally as the EV charger 100 provides connections to facilitate expanding energy storage capacity by adding external battery packs. The battery packs 551 with battery modules 611 to 614, as shown in FIG. 4A, may be charged by the input electrical power. Charging refers to the EV charger 100 receiving electrical power via input ports of electrical power from one or more energy sources.

The EV charger 100 has a start button 701 and an emergency stop button 702 that provide input to the main control system board 110, as shown in FIG. 6B, when activated by an operator of the EV charger 100. The EV charger 100 has an LCD indicator 200 that shows the charging and discharging status of the system. The functionality of the start button 701 and the emergency stop button 702 may be complemented by remote control internal switches controlled via an external wireless remote control, an app on a personal handled device (PDA) connected wirelessly, or a network connection (wired or wireless) from an external computer or similar network device.

Figure 2A:
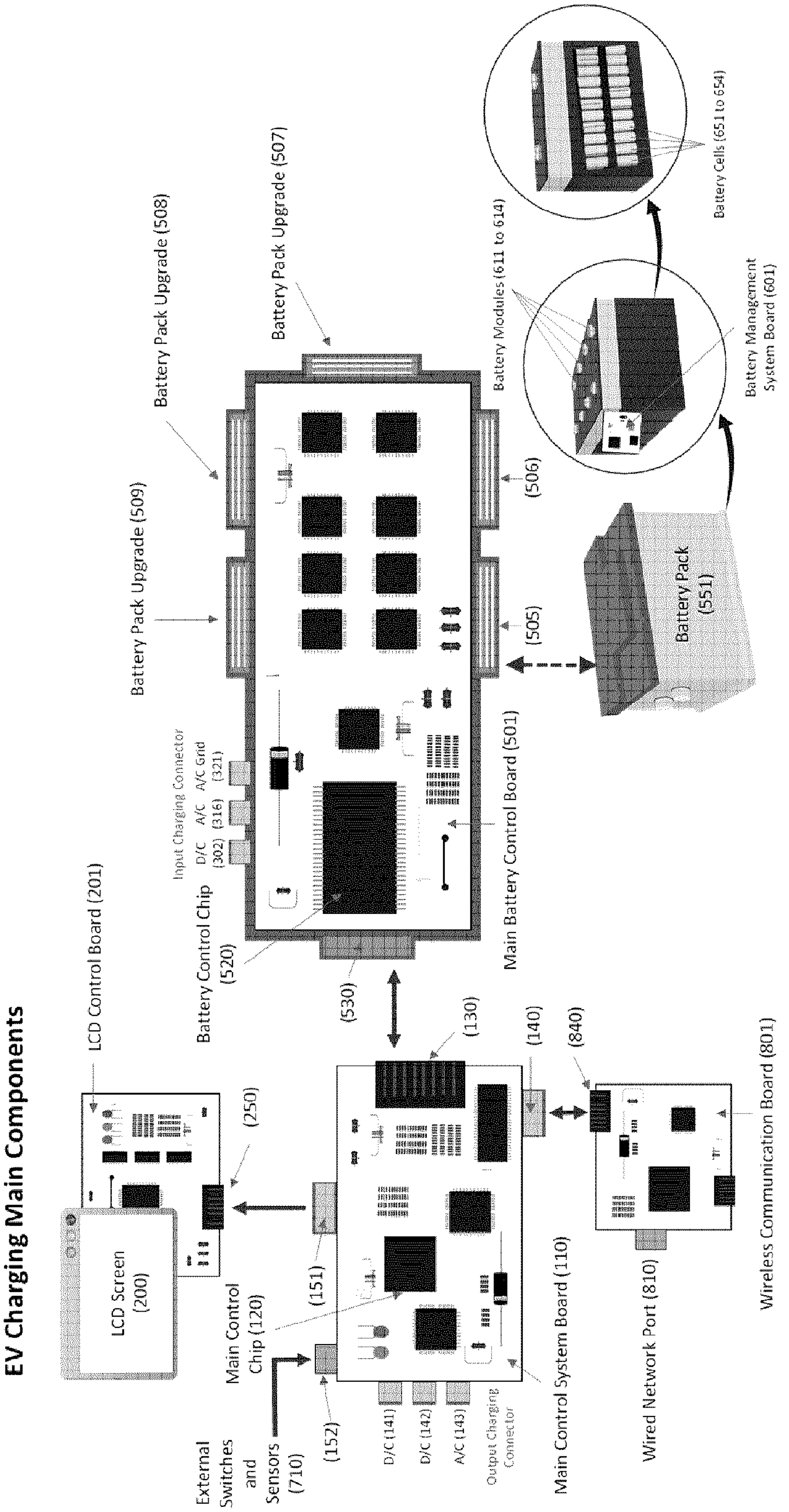
FIG. 2A shows components and control systems of an example smart battery based electric vehicle charging system with multiple input ports and multiple output ports.

The EV charger 100 has a wireless communication board 801, as shown in FIG. 2A. This wireless communication board 801 may use a number of wireless protocols to communicate with external devices, servers, and any connected battery packs, battery modules, or battery cells that have wireless capability. These protocols include but are not limited to Wi-Fi, Zigbee, Bluetooth, BLE, Z-Wave, 6LoWPAN, NFC, GSM, LTE, LoRa, NB-IoT, wireless Modbus, and others.

Figure 1B:
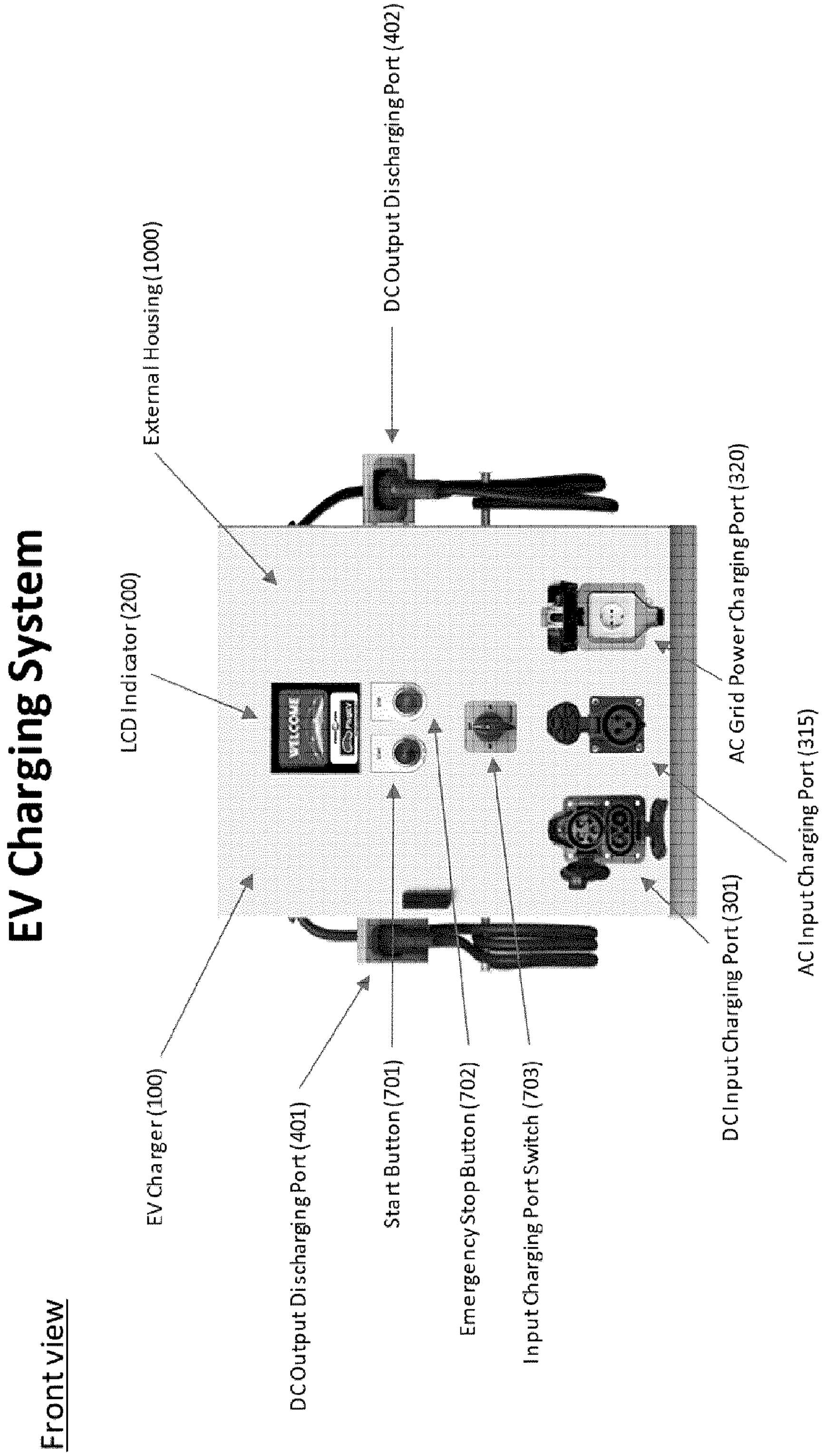
FIG. 1B shows a front view of an example smart battery based electric vehicle charging system with multiple input ports and multiple output ports.

FIG. 1B shows a front view of an example EV charger 100, which may also be referred to as smart battery based EV charging system with multiple input ports and multiple output ports.

Figure 1C:
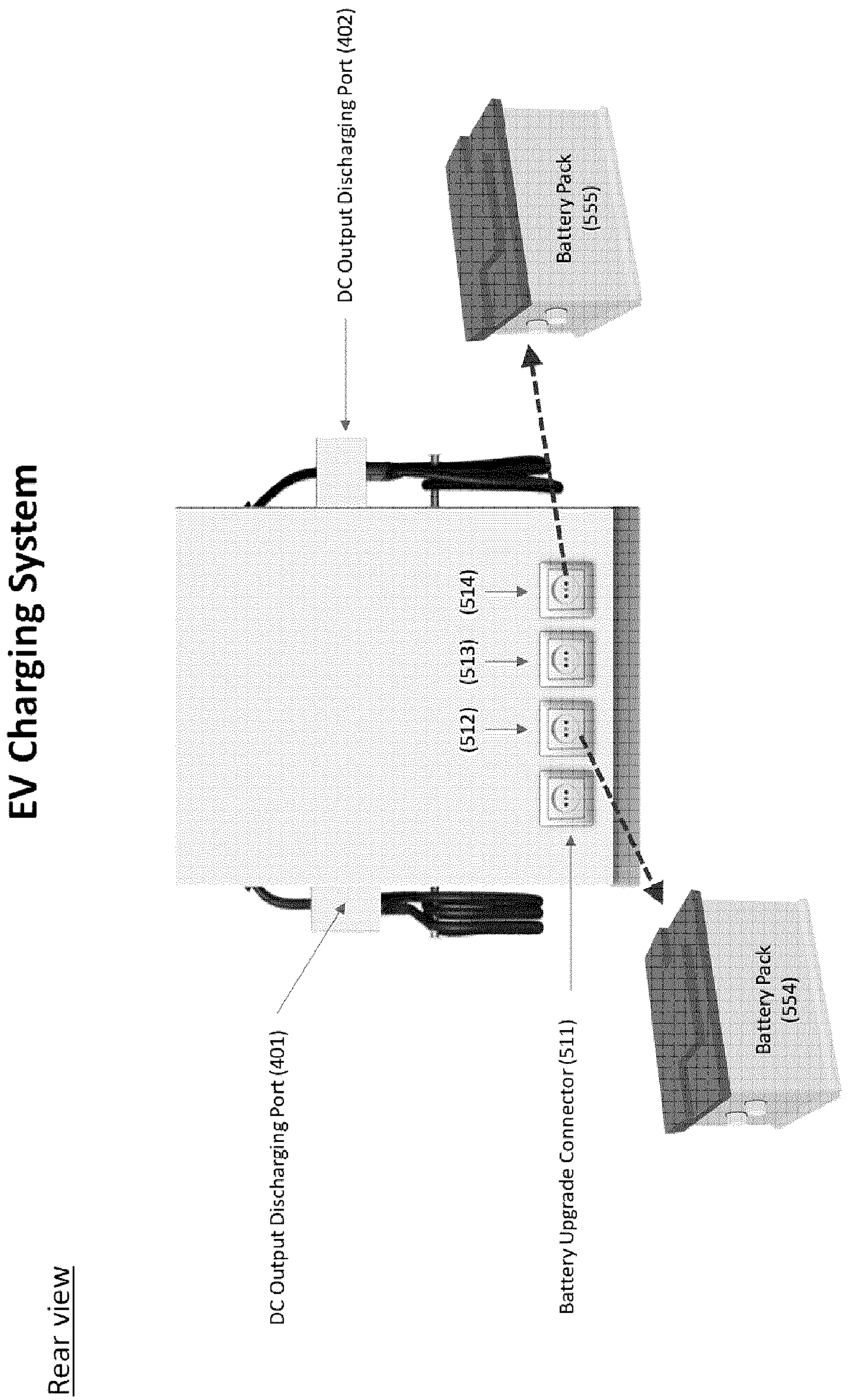
FIG. 1C shows a rear view of an example smart battery based electric vehicle charging system with multiple input ports and multiple output ports.

FIG. 1C shows a rear view of an example EV charger 100, or smart battery based EV charging system with multiple input ports and multiple output ports. The EV charger 100 has a plurality of extension ports to connect additional battery packs 554, 555. For example, the extension ports include battery upgrade connectors 511, 512, 513, and 514. Connecting additional battery packs 554, 555 to connectors 511, 512, 513, and 514 increases the capacity of the EV charger 100 for discharging to one or more connected loads. That is, the additional battery packs 554, 555 provide additional discharging capacity for the EV charger 100. The EV charger 100 has a plurality of output ports connectable to deliver electrical power to one or more loads, such as EVs. For example, the output ports may include DC output discharging port 401, and DC output discharging port 402.

Figure 1D:
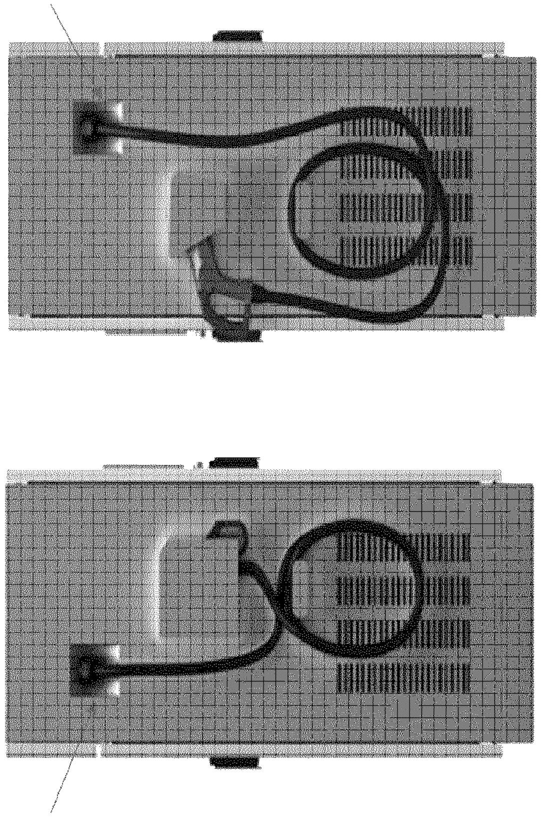
FIG. 1D shows a side view of an example smart battery based electric vehicle charging system with multiple input ports and multiple output ports.

FIG. 1D shows a side view of an example EV charger 100, or smart battery based electric vehicle charging system with multiple input ports and multiple output ports. The DC output discharging port 401 and DC output discharging port 402 could be CCS Type 1 or 2, CHAdeMo, or another EV Charging Port standard.

FIG. 2A shows components and control systems of an example EV charger 100, or smart battery based electric vehicle charging system with multiple input ports and multiple output ports.

The LCD indicator 200 is controlled by a LCD control board 201 with a connector 250 connected to the EV charger 100 through a connector 151. The LCD indicator 200 may have an interface of visual elements that is controlled by the LCD control board 201. The main control system board 110 may be connected to the LCD control board 201 to provide control signals relating to the LCD indicator 200. Visual elements of the LCD indicator 200 may display the charging and discharging status of EV and battery packs, for example.

The wireless communication board 801 has a connector 840 that connects to the main control system board 110 through a connector 140. This wireless communication board 801 may use a number of wireless protocols to communicate with external devices, servers, and any connected battery packs, battery modules, or battery cells that have wireless capability. These protocols include but are not limited to Wi-Fi, Zigbee, Bluetooth, BLE, Z-Wave, 6LoWPAN, NFC, GSM, LTE, LoRa, NB-IoT, wireless Modbus, and others. The wireless communication board 801 also has a wired network port 810 that may be used for a wired connection to a local area network. This wired connection may be an Ethernet connection.

Figure 6A:
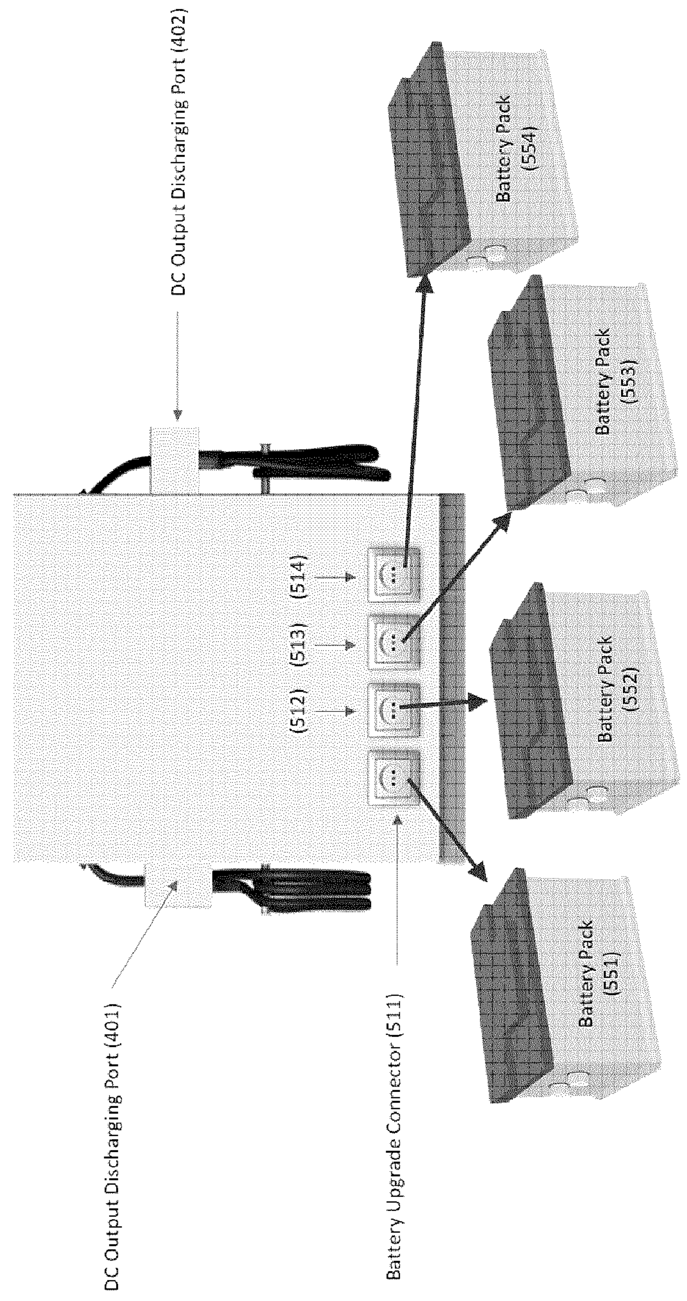
FIG. 6A illustrates an example connection of an external battery pack to the system through the main battery control board connectors.
Figure 6B:
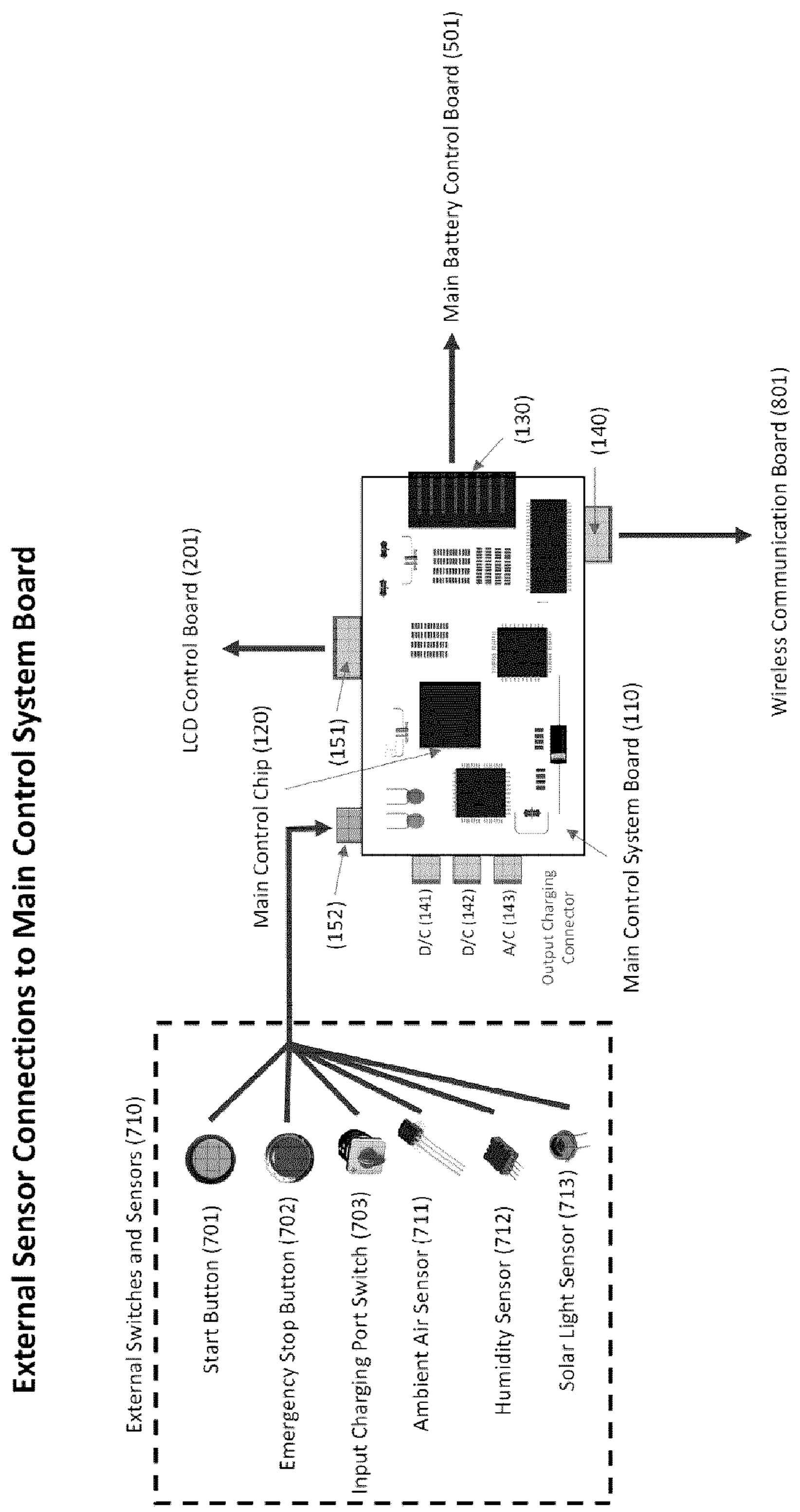
FIG. 6B shows examples of external sensor connections to the main control system board.

The EV charger 100 has a main battery control board 501 that has a plurality of battery pack connectors 505, 506, 507, 508, 509 connected to battery packs 551, 552 and other additional battery packs 553, 554, as shown in FIG. 6A. The battery packs have one or more battery modules 611, 612, 613, 614 and may have a battery management system board 601. Each battery module has one or more battery cells 651, 652, 653, 654. If battery management system board 601 is present, the charging and discharging of the battery packs are controlled by a battery management system board 601 that communicates with the main battery control board 501 to monitor each battery pack and battery module status, and control the charging and discharging of the individual battery modules inside the battery pack. In some embodiments, each battery module may also have a battery management system board 601 to control the charging and discharging of each battery cell. In such cases, this battery management system board 601 also communicates with the main battery control board 501 to monitor each battery module and battery cell status. The main battery control board 501 may send charging instructions to battery management system board 601 to alter the charging and discharging techniques and/or parameters if the battery management system board 601 has this capability. The main goal of controlling the charging and discharging at the battery module and battery cell level is to compensate for inferior modules and cells and improve the overall life of the battery pack by preventing individual battery module and battery cell failures. The main battery control board 501 has a plurality of input charging connectors. For example, the input ports may include a DC input charging port 302, an AC input charging port 316, AC grid power charging port 321. The main battery control board 501 has a battery control chip 520 that monitors battery pack status, battery module status (if information is available from battery pack), battery cell status (if information is available from battery pack), and controls and monitors charging and discharging of the battery packs, of the battery modules (if battery pack has this feature) and the battery cells (if battery pack has this feature). The main battery control board 501 and battery control chip 520 may control charging parameters including but not limited to voltage level, current level, voltage waveform, current waveform, and pulsed or continuous charging, depending on the condition of the battery, load requirements, environmental conditions, and other external factors.

The main battery control board 501 is connected to the main control system board 110 through a connector 530 on the main battery control board 501 and a connector 130 on the main control system board 110. The main control system board 110 is a central control system that monitors and controls the main battery control board 501, wireless communication board 801, and LCD control board 201. The main control system board 110 controls a plurality of EV charging ports 141, 142, 143. For example, the DC output charging ports 401, 402, as shown in FIG. 1D, may be connected to the EV charging ports 141, 142. The EV charger 100 may have multiple types of output ports if required. For example, the output ports may include extra AC output charging port 143. The main control system board 110 programs how to allocate the charging and discharging of the battery packs through the connection to the main battery control board 501. For example, if two EVs 901, as shown in FIG. 8B, are connected, they may simultaneously be charged or only one of the EVs may be charged. The main control system board 110 decides which battery packs will be used for charging the EVs 901 and how much power is drawn from each pack. The main control system board 110 decides which battery packs are charging and which battery packs are discharging at a given time. The main control system board 110 has a main control chip 120 that controls the main control system board 110. The main control system board 110 may have inputs from external sensors 710, the information from which may aid in optimizing charging and discharging settings based on environmental and other external parameters. As shown in FIG. 6B, these external sensors may include but are not limited to ambient air sensors 711, humidity sensors 712, and solar light sensors 713. The main control system board 110 is connected to the external sensors 710 through a connector 152. Accordingly, the main battery control board 501 has a battery control chip 520, and the main control system board 110 has a main control chip 120.

Figure 2B:
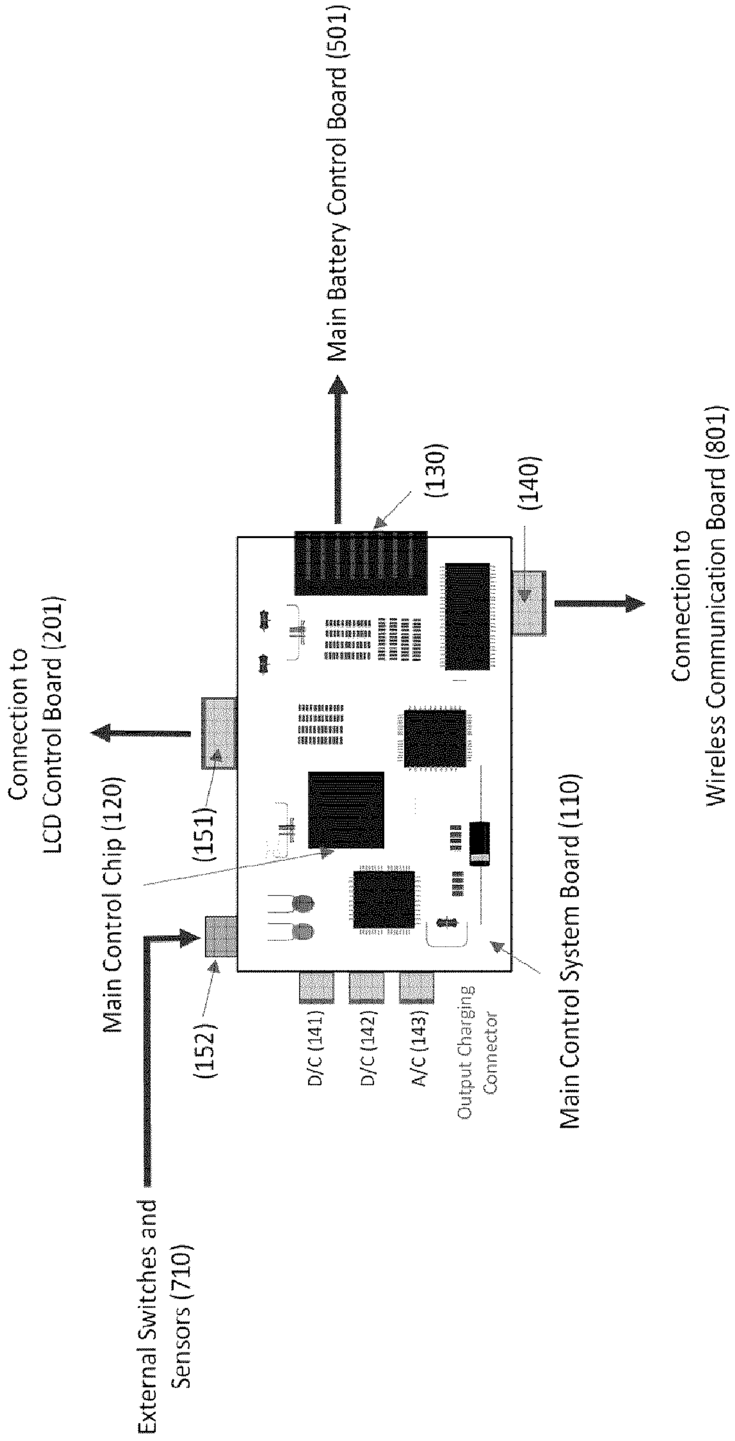
FIG. 2B illustrates an example of the main control system board and connections to the other control boards of a smart battery based electric vehicle charging system.

FIG. 2B illustrates an example of the main control system board 110 and connections to the other control boards 201, 501, 801 and to the external sensors 710 of a smart battery based EV charging system.

Figure 3A:
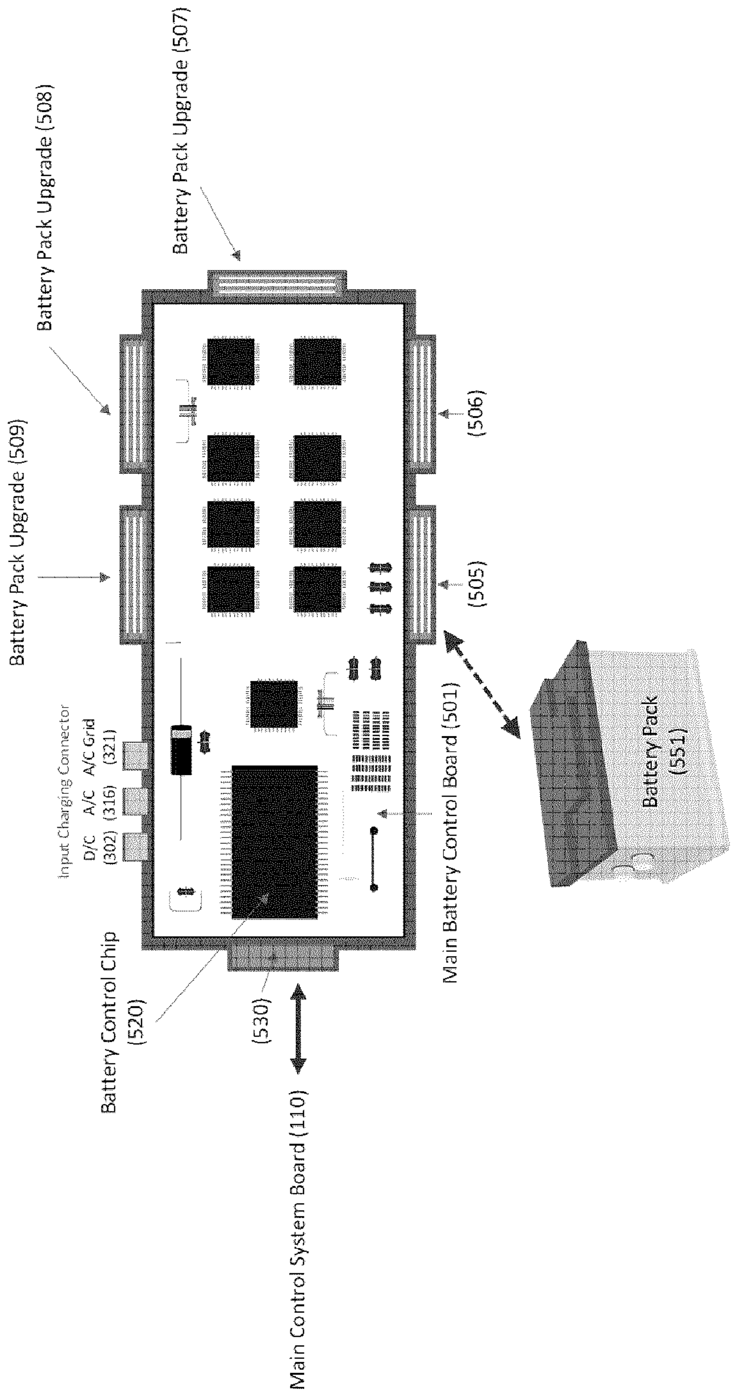
FIG. 3A illustrates an example connection between the main battery control board and battery pack of a smart battery based electric vehicle charging system.
Figure 5:
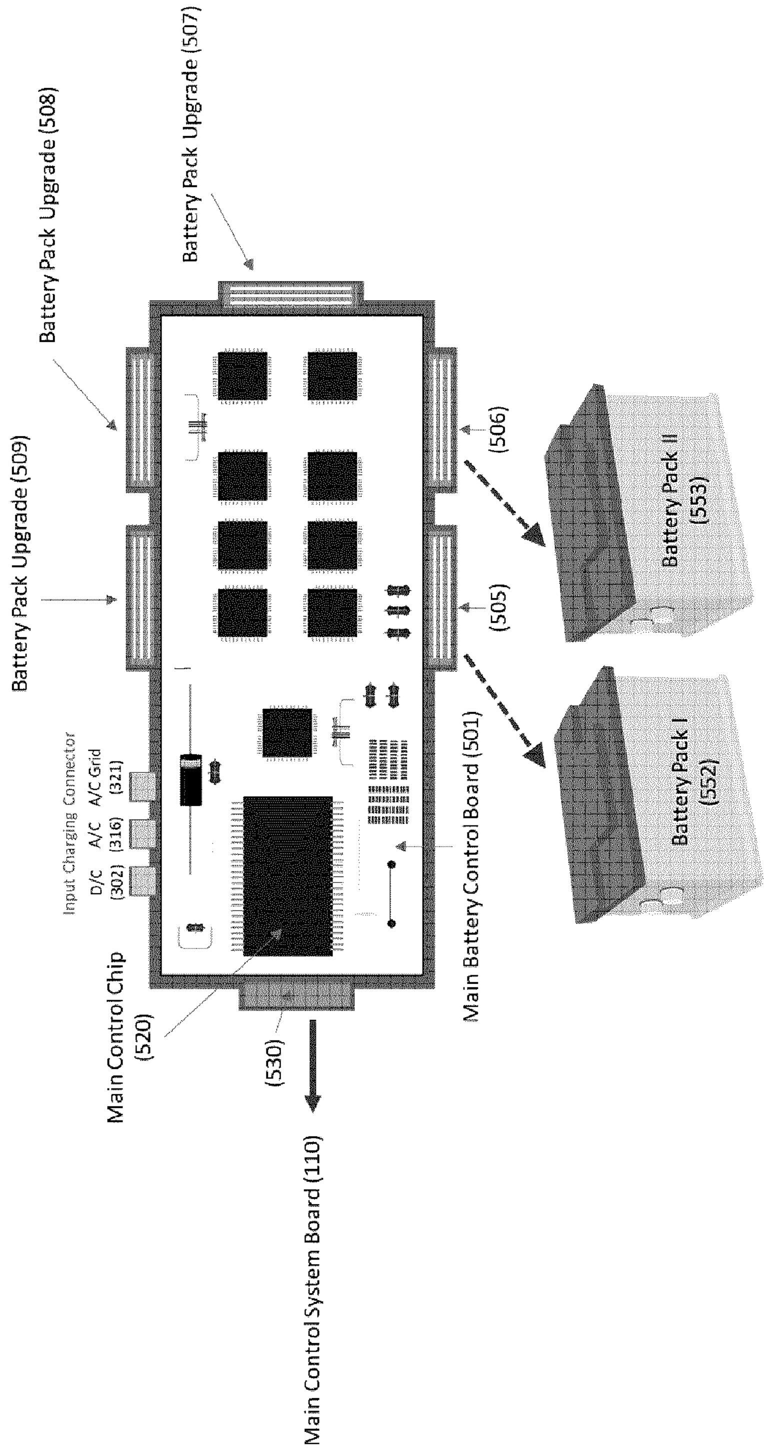
FIG. 5 illustrates an example connection of multiple battery packs which can enable charging at higher voltages resulting in faster charging.

FIG. 3A illustrates an example connection between the main battery control board 501 and battery pack 551 of a smart battery based EV charging system. In this example, the main battery control board 501 connects to one battery pack 551. In other examples, the main battery control board 501 connects to multiple battery packs. See for example. FIG. 5 which shows the main battery control board 501 connecting to multiple battery packs 552, 553.

Figure 3B:
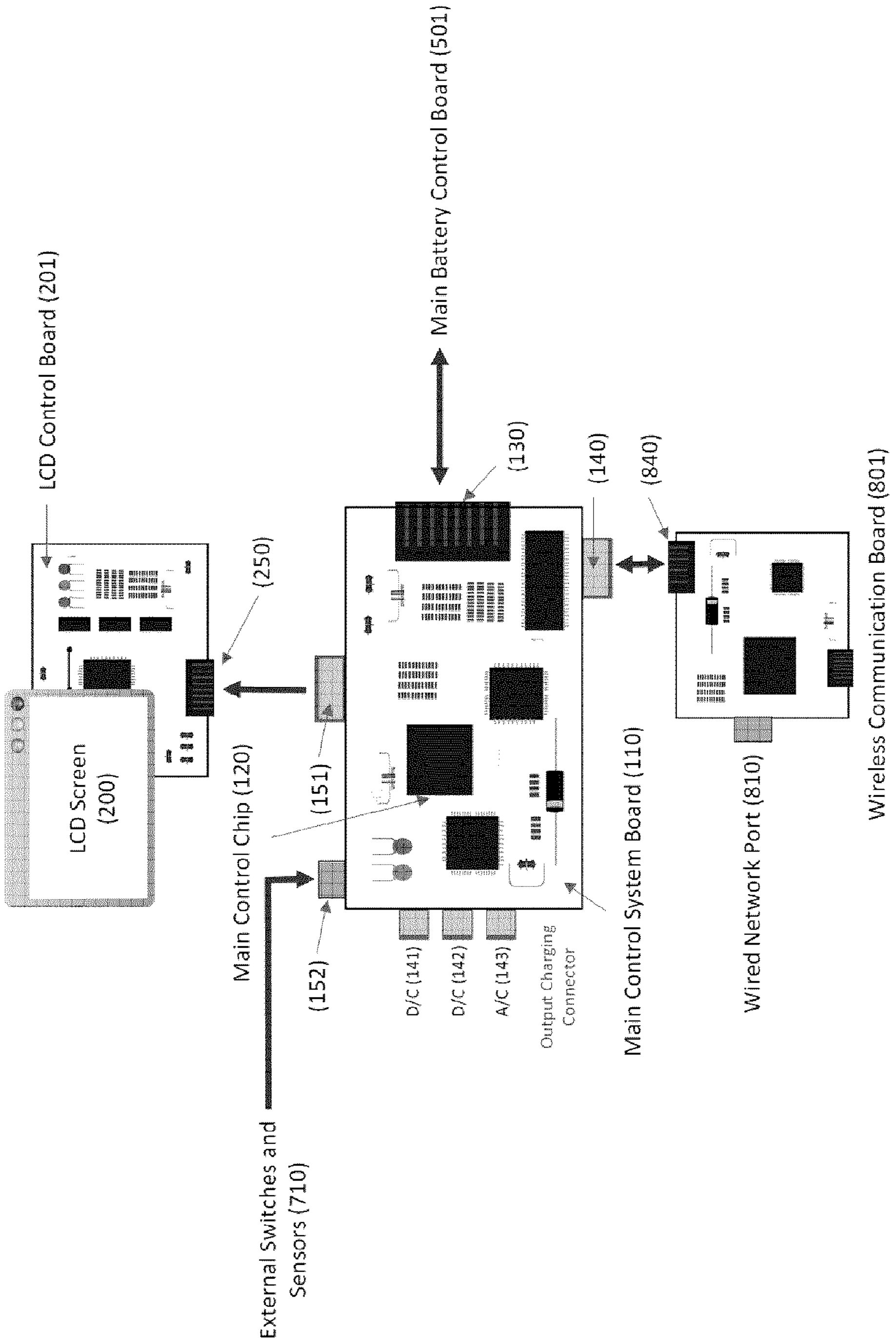
FIG. 3B illustrates an example of the main control system board, the display and wireless communication boards, and the interconnection between these boards of a smart battery based electric vehicle charging system.

FIG. 3B illustrates an example connection between the main control system board 110 and other display and communications boards of an example EV charger 100, or smart battery based EV charging system.

Figure 12:
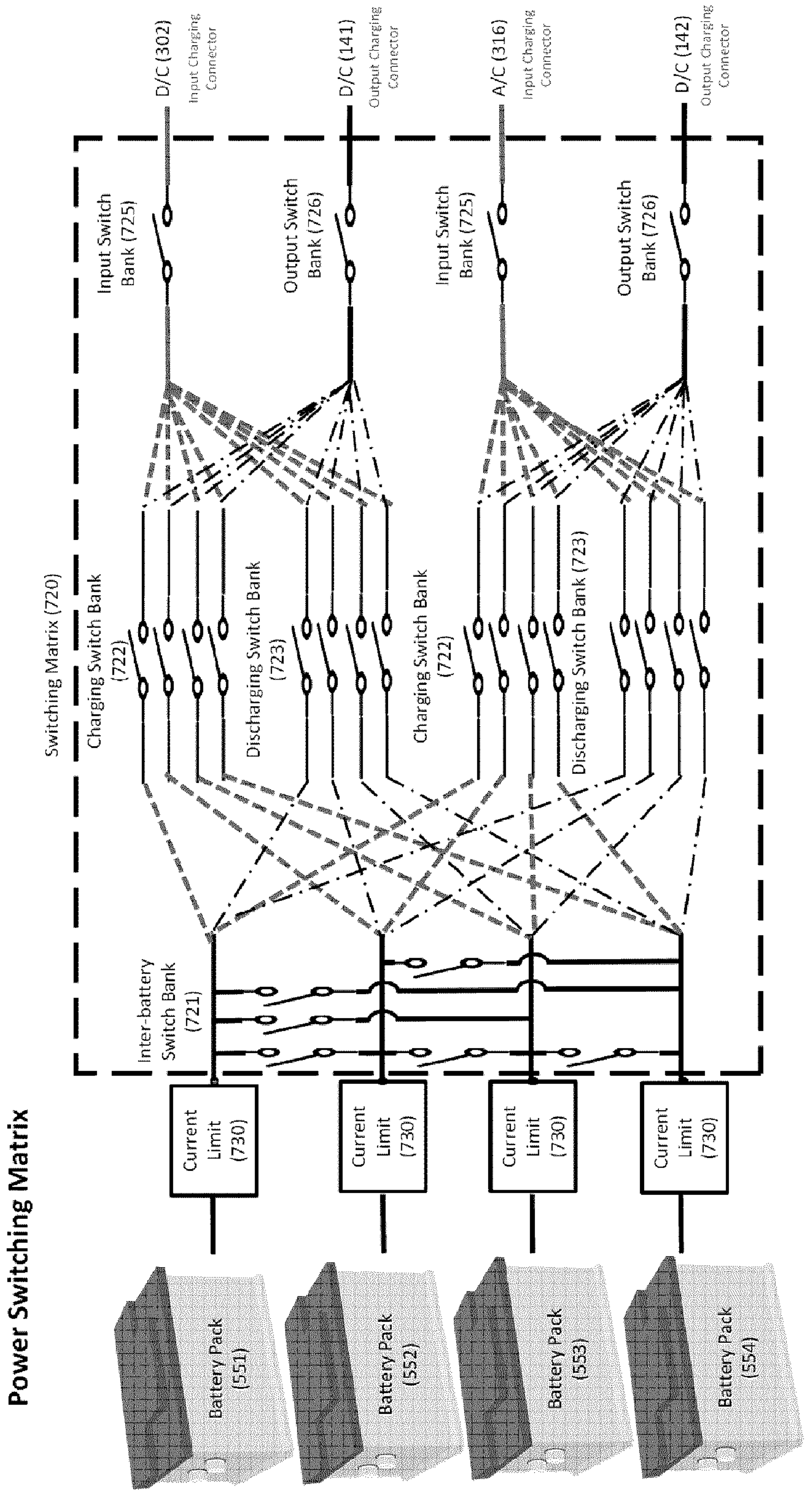
FIG. 12 shows an example power switching matrix according to embodiments described herein.

The main control system board 110 is a management system that monitors input electric power from the input ports to battery packs, output electric power from the output ports to the one or more loads, and battery status for the battery packs (and battery modules and battery cells if the information is available). The main control system board 110 and the main battery control board 501, which together may also be referred to as a main battery management controller, controls a switching matrix 720. The switching matrix 720 consists of five switch banks. An example of a switching matrix with two input ports, two output ports, and four battery packs is shown in FIG. 12. The input switch bank 725 switches control which input sources are used to charge the battery packs. The output switch bank 726 switches control which output loads the battery packs discharge into. The charging switch bank 722 controls which battery packs are charged from the input ports, while the discharging switch banks 723 control which battery packs discharge to the output ports. The inter-battery switch bank 721 enables battery packs to be connected in series to increase the charge voltage. The inter-battery switch bank 721 also enables any of the battery packs to charge any of the other battery packs which is useful to maintain all batteries at a minimum charge capacity to increase battery life and improve battery efficiency. All switch banks are controlled by the main control system board 110 and the main battery control board 501. The charging and discharging rates of the battery packs may be controlled by pulsing the switch banks on and off at a specific duty cycle or by adding current limit 730 circuitry in each series with the battery pack connections. The switching matrix 720 is part of the main control system board 110 and main battery control board 501.

The main control system board 110 provides a management system that separately controls charging of the battery packs from input power and discharging of the battery packs to the loads including but not limited to EVs. The main control system board 110 limits discharging rate of the battery packs for charging the EV based on remaining charge percentage and status of the battery packs, and the charging requirements for the EV, if known. For instance, if the EV is 80% charged already and the driver of the EV has two hours to spare, the charging rate may be set to a low level to improve battery pack life. The main control system board 110 has a security system that controls the authentication of users.

The switching matrix 720 connects the plurality of battery packs and the plurality of inputs, and the plurality of battery packs and the plurality of outputs. The switching matrix 720 selectively connects each battery pack to any number of the plurality of input ports or any number of the plurality of output ports, each input port to any number of battery packs, and each output port to any number of battery packs. The switching matrix is part of the main control system board 110 and main battery control board 501.

The main battery control board 501 is operably coupled to the switching matrix 720 for controlling connections between each battery pack and any number of the input ports or any number of the plurality of output ports.

FIG. 3A illustrates an example connection between the main battery control board 501 and battery pack 551 of an example EV charger 100, or smart battery based EV charging system. The main battery control board 501 controls EV charging parameters, such as charging voltage, and communicates with the main control system board 110 to obtain the desired charging rate requirements from the EV charger 100. The main control system board 110 may have pre-set programs so that the main battery control system 501 may combine the voltage from battery packs 551 with other available battery packs, such as battery pack 552, and provide a higher voltage to the main control system board 110. The main control system board 110 may then provide a higher voltage for EV charging to DC output discharging ports 401, 402.

FIG. 3B illustrates an example connection between the main control system board 110 and external sensors 710 and some other boards in the system such as the LCD control board 201, main battery control board 501, and wireless communication board 801, of EV charger 100, or a smart battery based EV charging system. The main control system board 110 may send data via connectors 151 and 250 to the LCD control board 201.

FIG. 4A shows an example battery pack 551 containing battery modules 611, 612, 613, 614. The battery pack 551 has a plurality of battery modules 611, 612, 613, 614. The battery pack 551 connects to battery management system board 601 generally located inside the battery pack. The battery modules 611, 612, 613, 614 provide energy storage capacity for the battery pack 551.

Figure 4B:
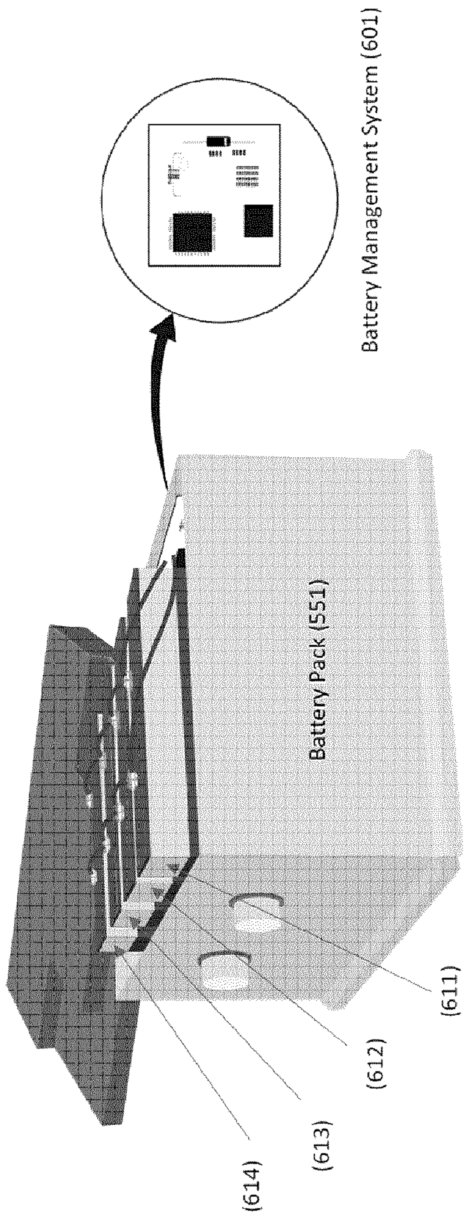
FIG. 4B shows example battery module connections inside a battery pack.

FIG. 4B shows example connections for the battery modules 611, 612, 613, 614 of the battery pack 551 and the battery management system board 601.

FIG. 5 illustrates an example connection of multiple battery packs 552, 553 to increase performance by enabling additional charge capacity, increased changing voltage, and increased charging rate. The main battery control board 501 may connect to multiple battery packs 552, 553 to increase the charging voltage if desired. For example, if battery pack 552 and battery pack 553 each have 400 volt capability and they are both connected in series via the inter-battery switch bank, this increases the overall voltage of the EV charger 100. By using this technique, the main control system board 110 may have one EV charging connection (401) and a connected EV 901 is able to handle high voltage, as shown in FIG. 8B, the main battery control board 501 could provide 800 volts from the two battery packs connected in series to the main control system board 110. The main control system board 110 may control the charging voltage to provide to the EV 901. If more than two battery packs are connected to the system, different charging voltages may be provided to different charging ports. For example, EV charging connection (401) may be set to 800 volts by combining battery packs 551 and 552, while EV charging connection (402) may be set to 400 volts from the third battery pack 553.

The EV charger 100 may have connectors 505, 506 to connect the battery packs 552, 553 to the main battery control board 501. The EV charger 100 may have additional battery pack upgrade connectors 507, 508, 509 to connect to additional battery packs. The main battery control board 501 may have a battery control chip 520 and a connector 530 to the main control system board 110.

FIG. 6A illustrates an example connection of an external battery pack to the EV charger 100. The connectors 511, 512 on the rear panel may be allocated to battery packs 551, 552 which connect to main battery control board 501 through connectors 505, 506 of the main battery control board 501. The connectors 507, 508, 509 (or battery pack upgrade connectors) of the main battery control board 501 may be allocated to connect to additional (e.g. external) battery packs 553, 554 through the unused connector sockets 513, 514 on the rear panel of EV charger 100.

FIG. 6B shows the connections to the main control system board 110 from the external switches and sensors. The EV charger 100 has a start button 701 and an emergency stop button 702 that provide input to the main control system board 110 when activated by an operator of the EV charger 100. The functionality of the start button 701 and an emergency stop button 702 may be complemented by remote control internal switches controlled via an external wireless remote control, an app on a personal handled device (PDA) connected wirelessly, or a network connection (wired or wireless) from an external computer or similar network device. The EV charger 100 may have selectable switches, such as input charging port switch 703, that establish the connection between components for charging and discharging and manually control the switching matrix 720, and/or may have remote control internal switches controlled via an external wireless remote control, an app on a personal handled device (PDA) connected wirelessly, or a network connection (wired or wireless) from an external computer or similar network device. The main control system board 110 may have inputs from external sensors, the information from which may aid in optimizing charging and discharging settings based on environmental and other external parameters. These external sensors may include but are not limited to ambient air sensors 711, humidity sensors 712, and solar light sensors 713.

Figure 7A:
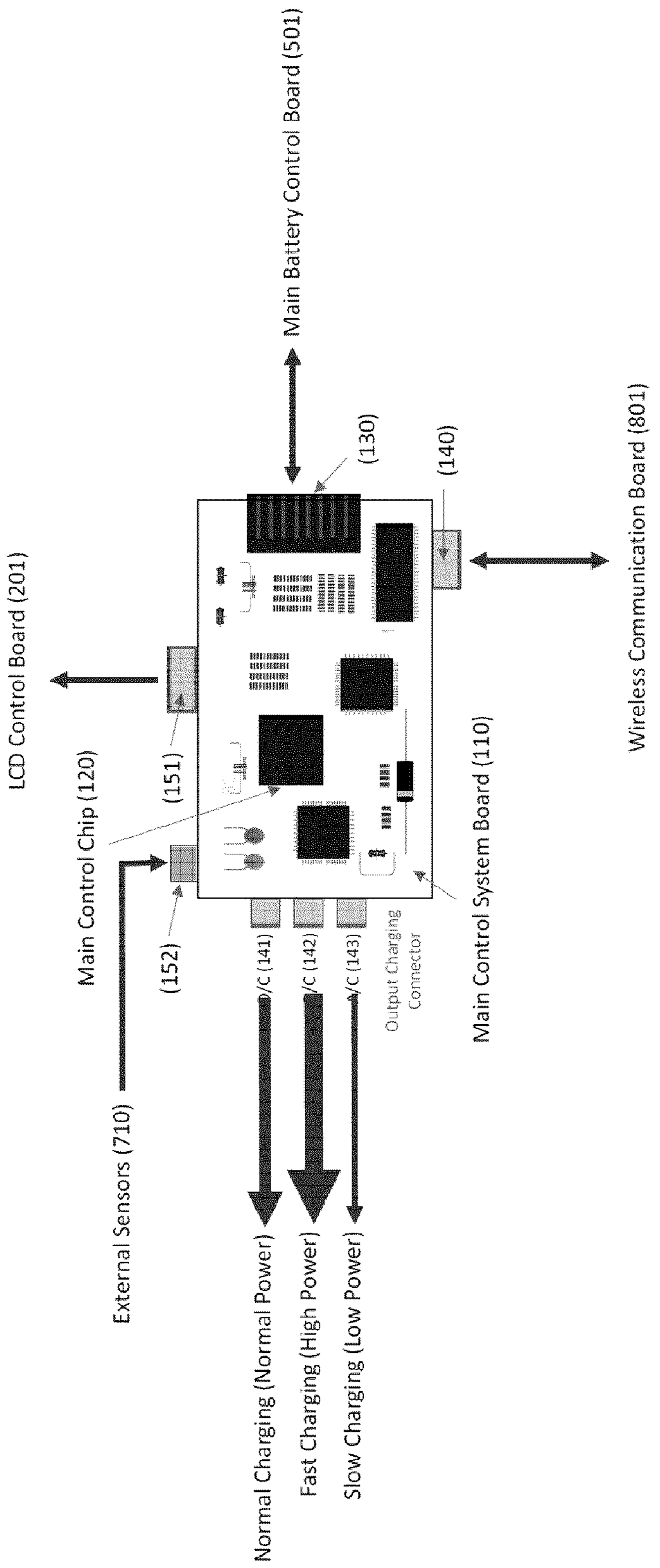
FIG. 7A shows an example of the main control system board automatically detecting the charging requirements of the output connections and distributing the power to each output port as required in an optimal manner.
Figure 10:
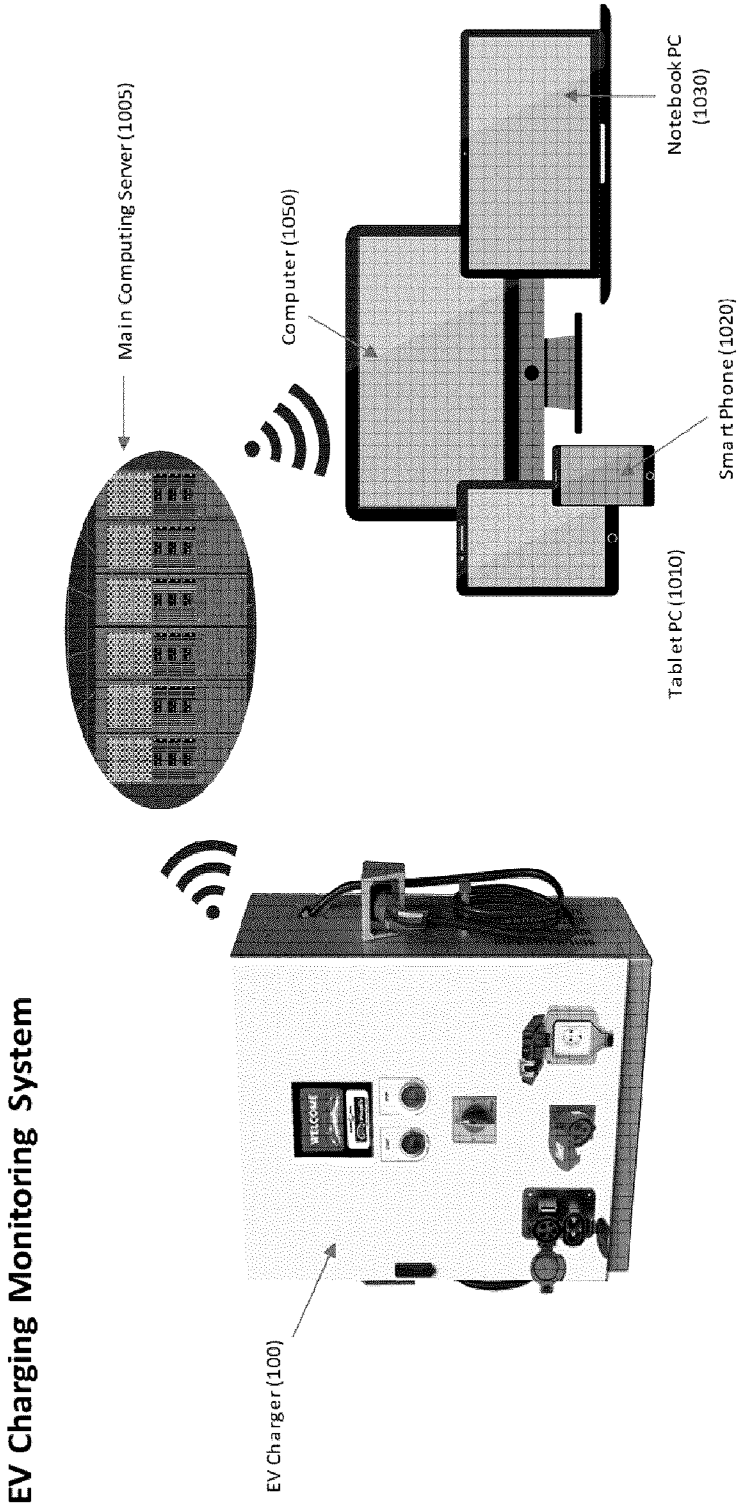
FIG. 10 illustrates example communications between the main computing server and the system.

FIG. 7A shows an example of power distribution control from the main battery control board 501 to the multiple discharging ports with output charging connectors 141, 142, 143. Power is distributed from the main battery control board 501 to the main control system board 110 and output charging connectors 141, 142, 143. The battery control chip 520 can be programmed with configurations for battery pack charging and discharging for a plurality of battery packs 551, 552, 553, 554. Charging and discharging are distributed through a current path from the main battery control board 501 to the main control system board 110 and output charging connectors 141, 142, 143. The main control system board 110 has a connector 151 to the LCD control board 201 to provide data and parameter settings relating to power distribution and the discharging ports. FIG. 7A shows an example main control chip 120 of the main control system board 110. The main control chip 120 may be programmed with all configurations for EV connections 141, 142, 143. The main control chip 120 may command and control the main battery control board 501 and communicate with a main computing server 1005, as shown in FIG. 10, through the wireless communication board 801. The main control system board 110 automatically detects connections to the discharging ports. The main control system board 110 automatically implements power distribution across the discharging ports.

Figure 7B:
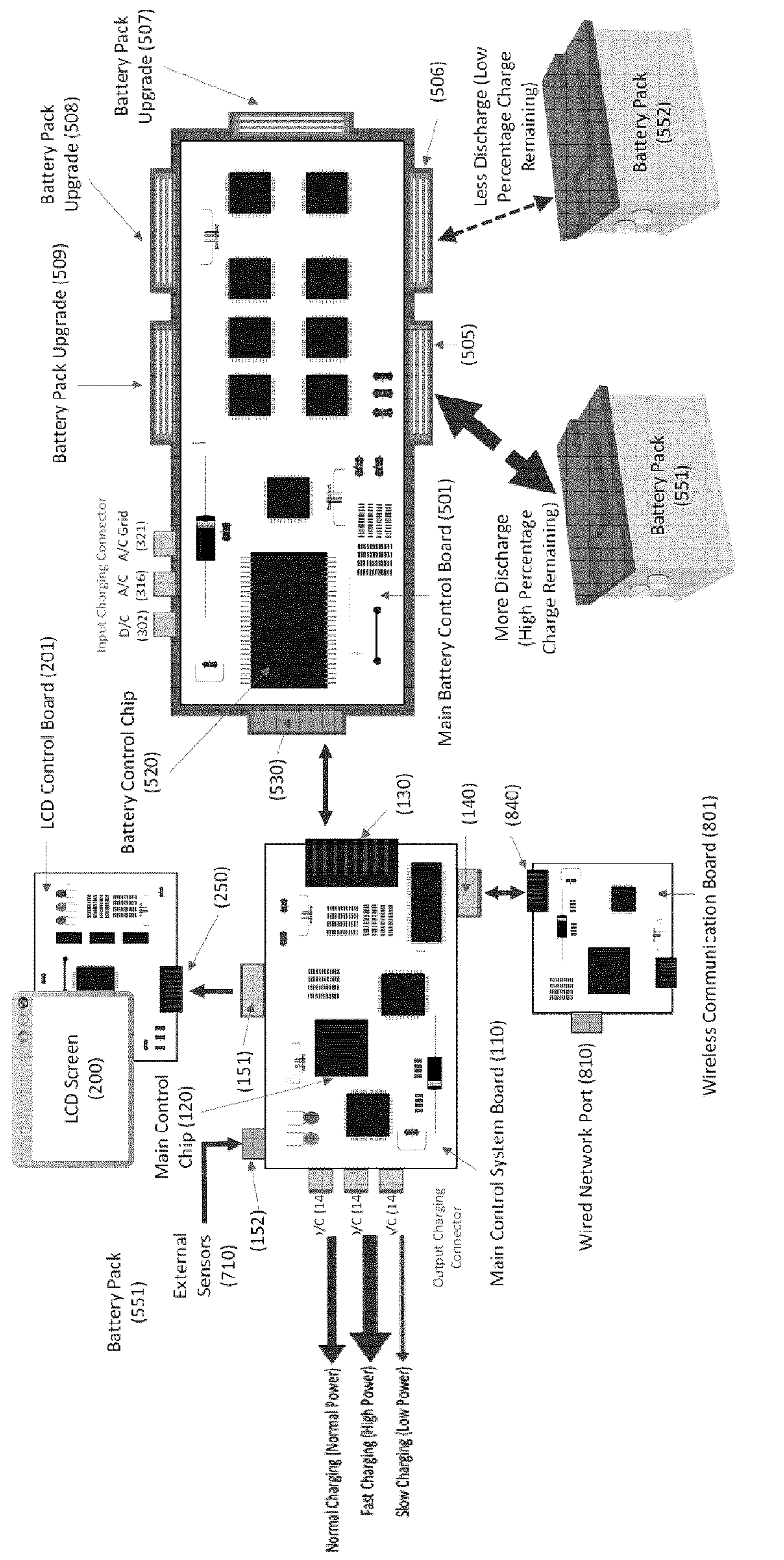
FIG. 7B illustrates an example of the main battery control board controlling the discharge from each battery pack based on the remaining charge in the battery pack.

FIG. 7B illustrates an example of the main control board system 110 and the main battery control board 501 controlling the discharge characteristics of the battery packs along with the output charge characteristics of the loads. In this example, the system draws more load charge current from battery pack 551 since it has a high percentage of charge remaining and draws less current from battery pack 552 since it has a low percentage of charge remaining. The main control board system 110 is the overall control mechanism of the EV charger 100, and all components of the EV charger 100 may be automatically controlled by programming the main control chip 120.

Figure 8A:
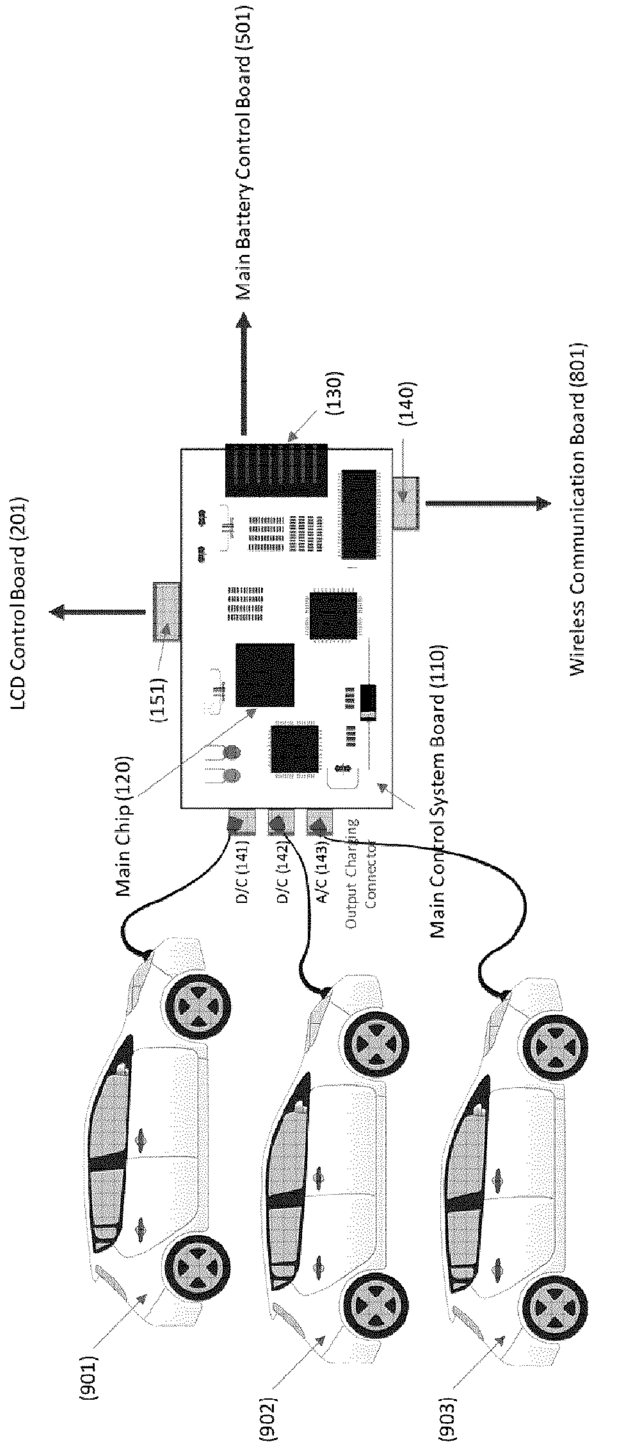
FIG. 8A illustrates an example of simultaneously charging multiple electric vehicles with each vehicle rate being regulated for optimal battery pack discharge.
Figure 8B:
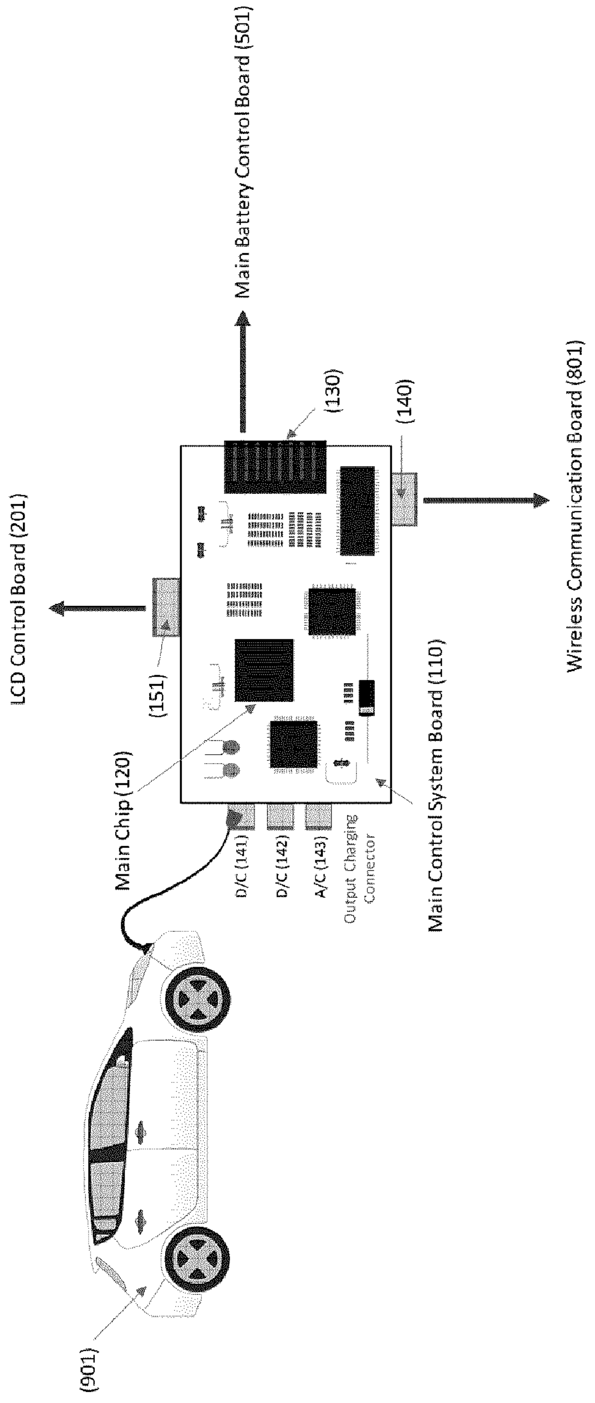
FIG. 8B illustrates an example of charging a single vehicle with a higher charging rate and charging voltage since only one vehicle is connected.

FIG. 8A illustrates an example EV charger 100 using the main control system board 110 to simultaneously charge multiple EVs 901, 902, 903. The main control system board 110 may have multiple discharging ports or output charging connectors 141, 142, 143 to connect to EVs 901, 902, 903. The main control system board 110 controls the discharging to EVs 901, 902, 903 to control how much power or voltage is delivered to each EV 901, 902, 903. Each EV 901, 902, 903 may receive different levels of power. For example, an EV 901, 902, 903 with only a little power may receive an increase in power/charge and an EV 901. 902, 903 that is almost fully charged may receive a decrease in power/charge. The output charging connectors 141, 142, 143 may be of different types (e.g. D/C, A/C) to accommodate different EV charging configurations.

FIG. 8B illustrates an example EV charger 100 that connects to an EV 901 to provide fast charging or higher voltage supply through an output charging connector 141 of the main control system board 100. A connected electric vehicle 901 may have a connection with high voltage supply from two batteries connected in series via a connection to discharging port 401 of the main control system board 110.

Figure 9:
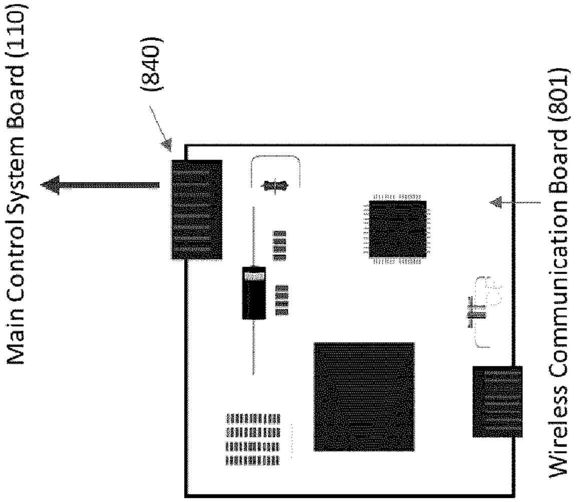
FIG. 9 shows an example wireless communication board.

FIG. 9 shows an example wireless communication board 801. The wireless communication board 801 may wirelessly transmit and receive data. The wireless communication board 801 has a connection to the main control system board 110 for transferring data to and from a server, computer or other network connected device. The EV charger 100 may also transfer data through wired connection 810. The EV charger 100 could be monitored and managed remotely through a live wired or wireless connection. The main control system board 110 is connected to the wireless communication board 801 via connectors 140 and 840, as shown in FIG. 7B. The wireless communication board 801 may transfer some or all activities of the main control system board 110 and some or all activities of the main battery control board 501. The main control system board 110 may send status data about the EV charger 100 to a main server management system that may monitor each component and battery pack status. The main control system board 110 may send diagnostic information about the system and components of the system periodically to the server management system and also send alarms and warning messages if the system has a fault or there is a fault predicted to occur. Messages may also be sent to select maintenance and operations personnel with actions and recommendations. The main control system board 110 (or main server management system) may send the charging and discharging data to the LCD control board 201 and LCD indicator 200 to display the data for users. For example, the data may include location, capacity of battery packs, remaining charge percentage of battery packs, charging and discharging status, estimated timing data, and so on.

FIG. 10 illustrates example communications between the main computing server 1005, the system, and other network connected devices. The EV charger 100 is connected to the main computer server 1005. The main computing server 1005 is a data server that may receive data from multiple EV chargers 100. The computing server 1005 may communicate with a plurality of electronic devices to provide data relating to EV chargers 100. For example, the electronic devices may include Tablet PC 1010, Smart Phone 1020, Notebook PC 1030, Computer 1050.

Figure 11:
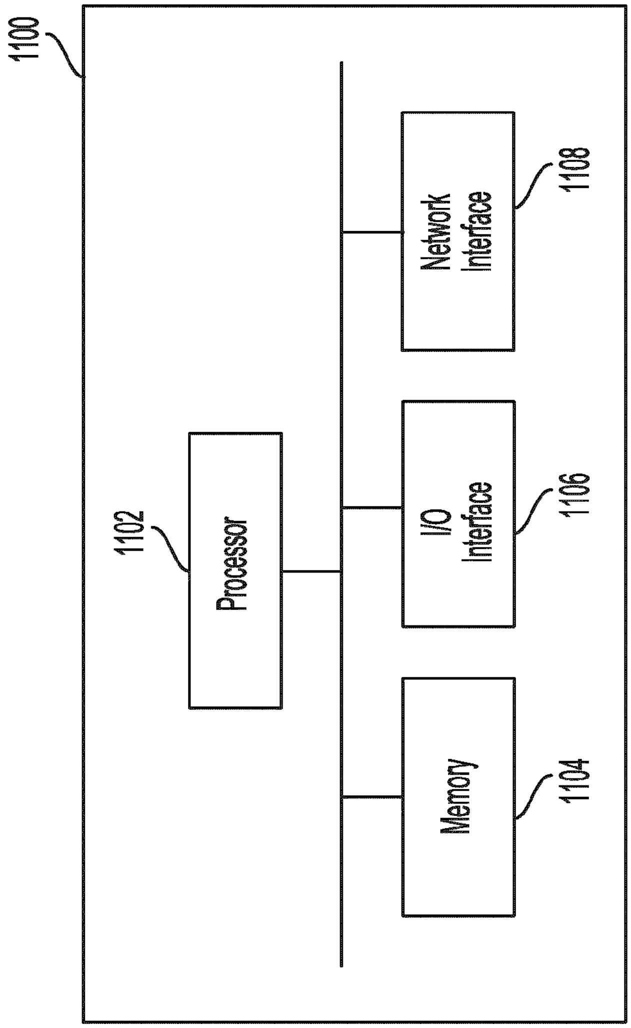
FIG. 11 shows an example electronic device.

The electronic devices may have memory storing instructions and a processor to execute the instructions to provide an interface displaying data relating to EV chargers 100 that is received from the computer server 1005. For example, the electronic devices may have an EV driver application and charger operator application to indicate status of EV charging and status of discharging of the battery packs. FIG. 11 shows an example electronic device 1100.

FIG. 12 shows an example power switching matrix 720 according to embodiments described herein. The switching matrix 720 is part of the main control system board 110 and main battery control board 501. The example switching matrix 720 shown supports four battery packs, two input ports, and two output ports. The switching matrix 720 may be modified to support any number of battery packs, any number of input ports, and any number of output ports.

The switching matrix 720 can be connected between the battery packs 551, 552, 553, 554 and the inputs ports or input connectors 302, 316. The switching matrix 720 can be connected between the battery packs 551, 552, 553, 554 and the output ports or output connectors 141, 142. The switching matrix 720 is configured to selectively connect each battery pack 551, 552, 553, 554 to any number of the input ports or any number of the output ports. The switching matrix 720 is configured to selectively connect each input port to any number of battery packs 551, 552, 553, 554, and each output port to any number of battery packs 551, 552, 553, 554.

The switching matrix 720 couples to a current limit 730 component to limit current between the switching matrix 720 and the battery packs 551, 552, 553, 554. The switching matrix 720 has an inter-battery switch bank 721 to selectively connect to any of the battery packs 551, 552, 553, 554. The switching matrix 720 has a charging switch bank 722 and a discharging switch bank 723 that can individually and selectively connect to the inter-battery switch bank 721. The switching matrix 720 has an input switch bank 725 and an output switch bank 726. The input switch bank 725 can individually and selectively connect to input charging connectors 302, 316. The output switch bank 726 can individually and selectively connect to output charging connectors 141, 142.

Embodiments described herein relate to a stationary battery based EV charging system with multiple input ports and multiple output ports. These embodiments may also be used in other applications which include but are not limited to backup power systems for residences and commercial infrastructure, emergency power for critical services, remote power in areas where no power grid or power infrastructure is present, additional power for recreational and marine vehicles, off-grid power for street lighting, and portable power for any application that requires it.

Accordingly, in an aspect, some embodiments described herein provide a stationary battery EV charging system.

Figure 13:
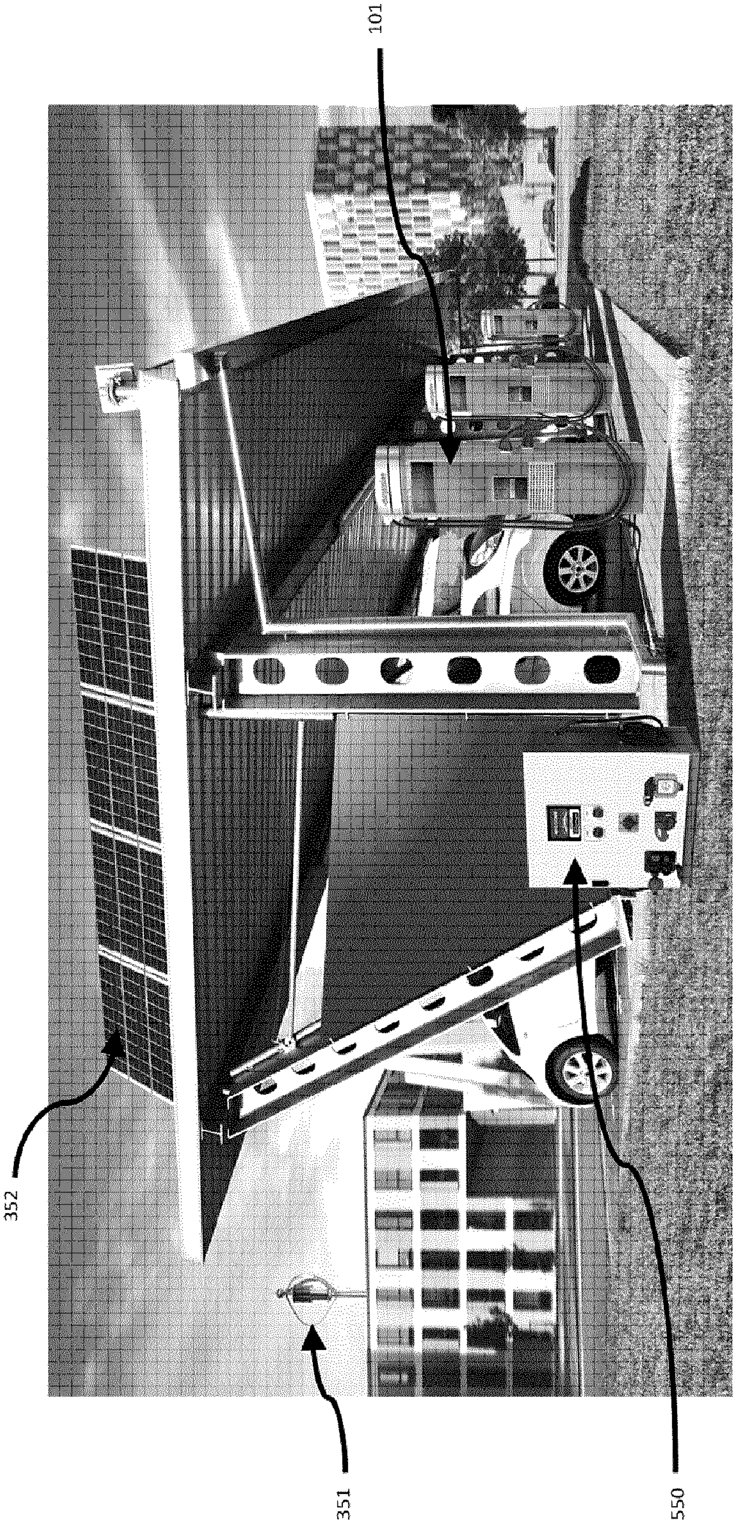
FIG. 13 shows an example stationary battery based EV charging system according to embodiments described herein.

FIG. 13 shows an example stationary battery based EV charging system having an EV charging station 101 according to embodiments described herein. The example shows a stationary battery based electric vehicle charging facility, similar to a gas station for gasoline powered vehicles, with multiple input ports and multiple output ports.

FIG. 13 shows an example stationary battery based commercial EV charging system facility, similar to a gas station for gasoline powered vehicles, with one or more stationary EV battery based chargers 101. Each stationary EV battery based charger 101 is contained within an external housing 1000 and has multiple input ports and multiple output ports. The stationary EV battery based charger 101 may have the same functionality and components as the EV charger 100, including a battery pack inside the enclosure. The inputs to the stationary battery based commercial electric vehicle (EV) charging system generally come in from bottom side of the enclosure, although they may come in from any side of the enclosure. The facility may have one or more external battery pack cabinets 550 which houses one or more battery packs. The power inputs may include but is not limited to AC power (connections from standard commercial or residential electrical systems which are not shown), solar power (for example from solar panels 352), and wind power (for example from wind turbine 351).

Figure 14:
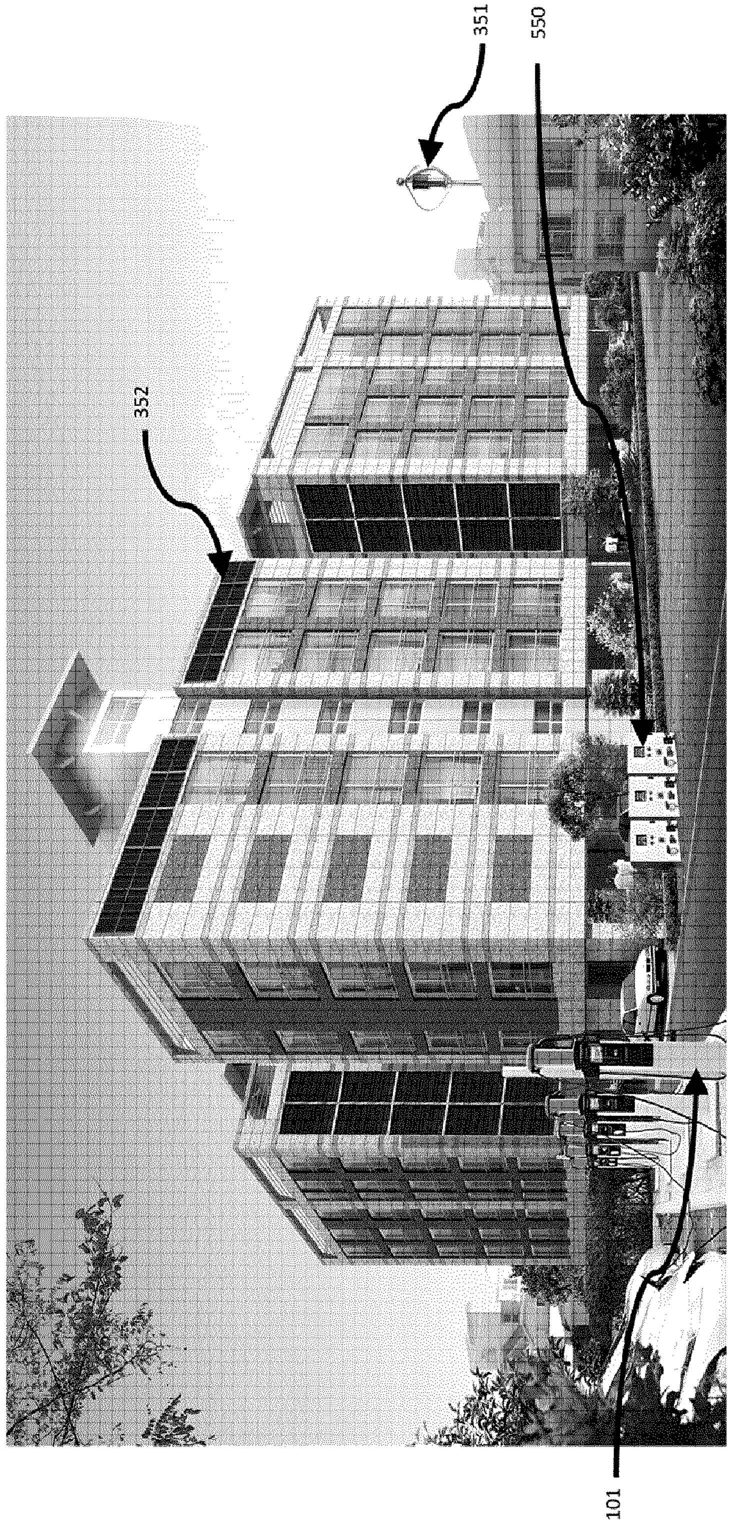
FIG. 14 shows an example stationary battery based EV charging centre according to embodiments described herein.

FIG. 14 shows an example stationary battery based EV charging centre with multiple EV charging stations 101 according to embodiments described herein. The example shows a stationary battery based commercial electric vehicle charging centre (for example at an apartment or office complex) with multiple input ports and multiple output ports.

FIG. 14 shows an example stationary battery based commercial EV charging centre (for example at apartment or office complexes) with one or more stationary EV chargers 101. Each stationary EV battery based charger 101 is contained within an external housing 1000 and has multiple input ports and multiple output ports. The stationary EV battery based charger 101 may have the same functionality and components as the EV charger 100, including a battery pack inside the enclosure. The inputs to the stationary battery based commercial electric vehicle (EV) charging system generally come in from bottom side of the enclosure, although they may come in from any side of the enclosure. The facility may have one or more external battery pack cabinets 550 which houses one or more battery packs. The power inputs may include but is not limited to AC power (connections from standard commercial or residential electrical systems which are not shown), solar power (for example from solar panels 352), and wind power (for example from wind turbine 351).

Figure 15:
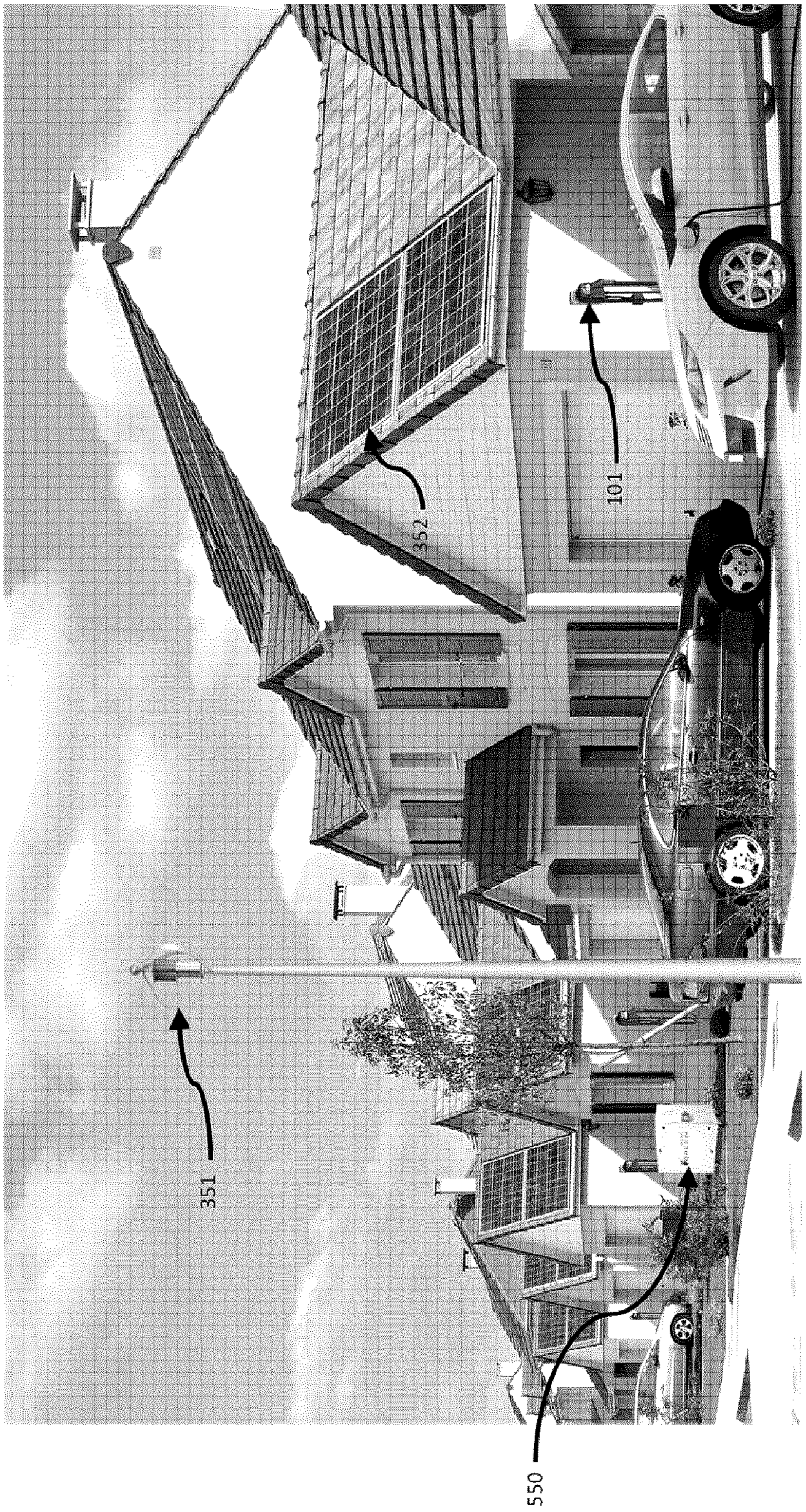
FIG. 15 shows an example stationary battery based residential EV charging system according to embodiments described herein.

FIG. 15 shows an example stationary battery based residential EV charging system according to embodiments described herein. Accordingly, the EV charging station 101 can be used for residential applications. The example shows a stationary battery based residential EV charging system (for example at residential house or town house) with multiple input ports and multiple output ports.

FIG. 15 shows an example stationary battery based residential EV charging system (for example at apartment or office complexes) with one or more stationary EV chargers 101. Each stationary EV battery based charger 101 is contained within an external housing 1000 and has multiple input ports and multiple output ports. The stationary EV battery based charger 101 may have the same functionality and components as the EV charger 100, including a battery pack inside the enclosure. The inputs to the stationary battery based commercial electric vehicle (EV) charging system generally come in from back side of the enclosure, although they may come in from any side of the enclosure. The facility may have one or more external battery pack cabinets 550 which houses one or more battery packs. The power inputs may include but is not limited to AC power (connections from standard commercial or residential electrical systems which are not shown), solar power (for example from solar panels 352), and wind power (for example from wind turbine 351).

Figure 16A:
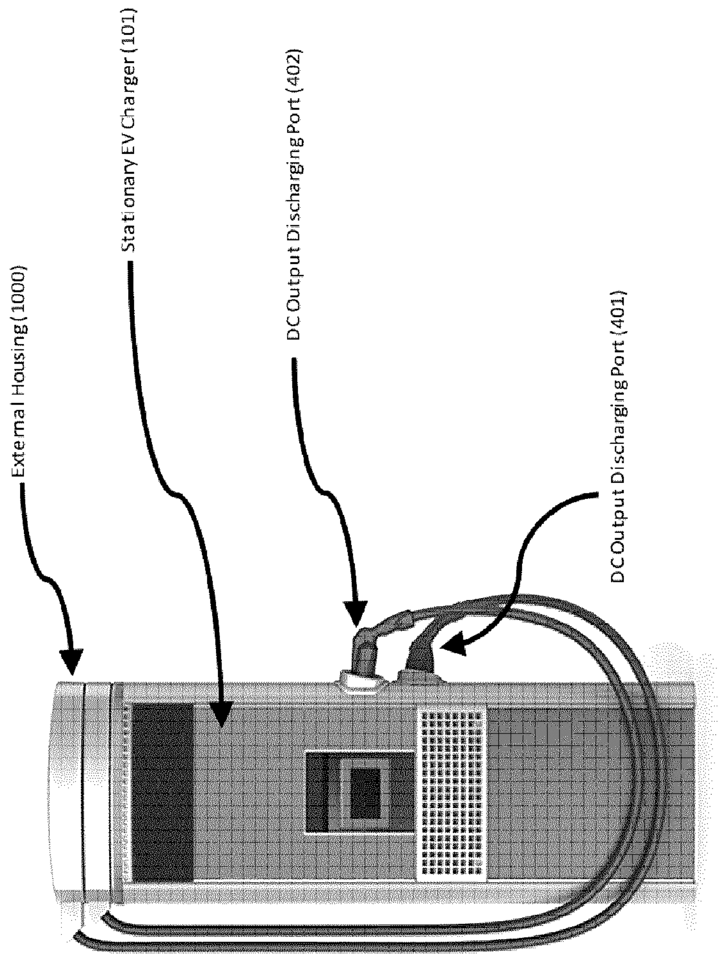
FIG. 16A shows an example stationary battery based EV charging station according to embodiments described herein.

FIG. 16A shows an example stationary battery based EV charging station 101 according to embodiments described herein. The EV charging station 101 can have an external housing 1000, input charging port 401, and output discharging port 402. The example shows a stationary battery based commercial EV charging station 101 with multiple input ports and multiple output ports.

FIG. 16A shows an example stationary EV battery based charger 101 within an external housing 1000 used for example at an EV charging facility, apartment or office complex. Each stationary EV battery based charger 101 has multiple input ports and multiple output ports. The stationary EV battery based charger 101 may have the same functionality and components as the EV charger 100, including a battery pack inside the enclosure. Similar to the EV charger 100, the stationary EV battery based charger 101 has DC output ports 401 and 402 such as CCS Types 1 and 2, CHAdeMo, Tesla, J1772, GB/T, IEC 62196 Type 2, and others.

Figure 16B:
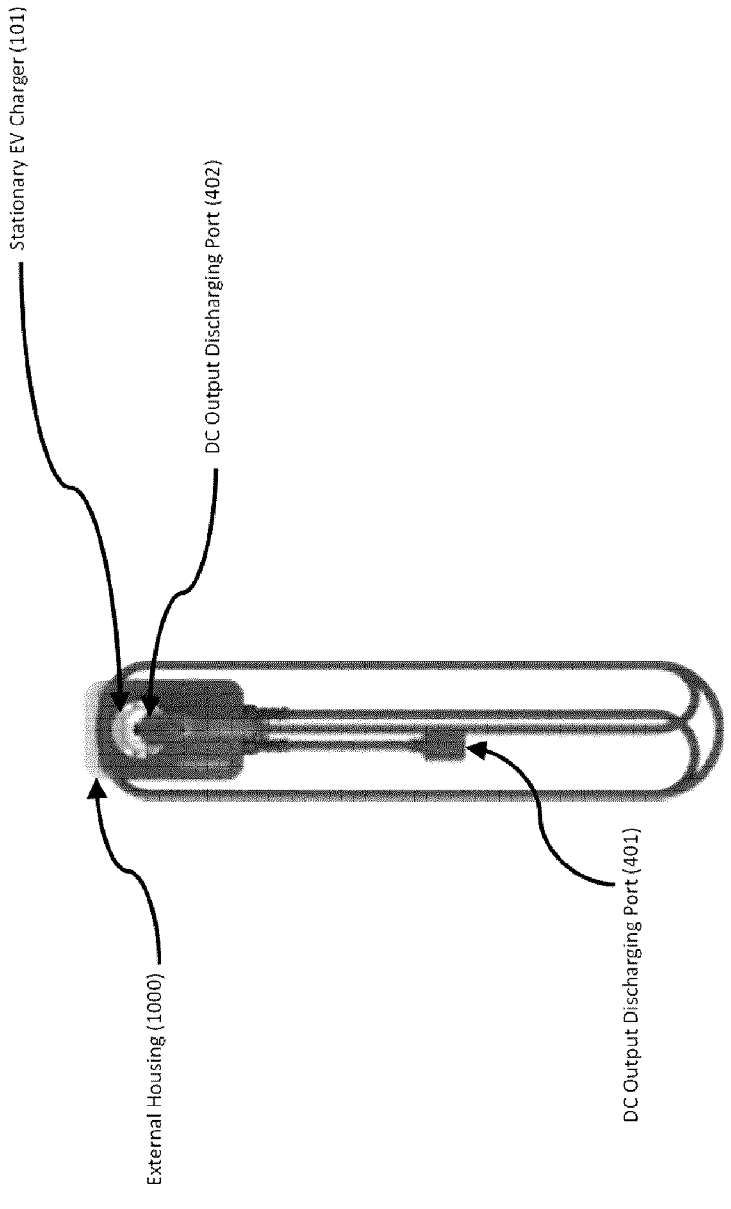
FIG. 16B shows an example stationary battery based residential EV charging station according to embodiments described herein.

FIG. 16B shows an example stationary battery based residential EV charging station according to embodiments described herein. The EV charging station 101 can be used for residential applications. The residential EV charging station 101 can have an external housing 1000, input charging port 401, and output discharging port 402. The example shows a stationary battery based residential EV charging station 101 with multiple input ports and multiple output ports.

FIG. 16B shows an example stationary EV battery based charger 101 within an external housing 1000 used for example at a residential property or town house. Each stationary EV battery based charger 101 has multiple input ports and multiple output ports. The stationary EV battery based charger 101 may have the same functionality and components as the EV charger 100, including a battery pack inside the enclosure. Similar to the EV charger 100, the stationary EV battery based charger 101 has DC output ports 401 and 402 such as CCS Types 1 and 2, CHAdeMo, Tesla, J1772, GB/T, IEC 62196 Type 2, and others.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices.

It should be appreciated that the use of such terms is deemed to represent one or more computing devices having at least one processor configured to execute software instructions stored on a computer readable tangible, non-transitory medium. For example, a server may include one or more computers operating as a web server, database server, or other type of computer server in a manner to fulfill described roles, responsibilities, or functions.

One should appreciate that the systems and methods described herein may different technical improvements and solutions such as better resource usage, improved charging and discharging, and so on.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they may not be omitted or substituted for mental means without having a material effect on the operation and structure of the embodiments described herein. The computer hardware is essential to implement the various embodiments described herein and is not merely used to perform steps expeditiously and in an efficient manner.

The EV charger 100 may include one or more computing devices with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing"). The EV charger 100 may also connect to one or more computing devices, such as computing server 1005.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

FIG. 11 is a schematic diagram of computing device 1100 that may implement aspects of embodiments described herein. For example, computing device 1100 may implement aspects of EV charger 100. As another example, computing device 1100 may implement aspects of main computing server 1005. As depicted, computing device 1100 includes at least one processor 1102, memory 1104, at least one I/O interface 1106, and at least one network interface 1108.

Each processor 1102 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1104 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1106 enables computing device 1100 to interconnect with one or more input devices, such as a keyboard, mouse, camera, touch screen and a microphone, or with one or more output devices such as a display screen and a speaker.

Each network interface 1108 enables computing device 1100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fibre optics, satellite, mobile, wireless (e.g. Wi-Fi, WiMAX), SS7 signalling network, fixed line, local area network, wide area network, and others, including any combination of these.

Computing device 1100 is operable to register and authenticate users (using a login, unique identifier, and password for example) prior to providing access to applications, a local network, network resources, other networks and network security devices. Computing devices 1100 may serve one user or multiple users.

Although the embodiments have been described in detail, it should be understood that various changes, substitutions and alterations may be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As may be understood, the examples described above and illustrated are intended to be exemplary only.

What is claimed is:

1. A battery electric vehicle (EV) charging system comprising:

a plurality of input charging ports connectable to receive electrical power from one or more energy sources, wherein the plurality of input ports comprise different types of input ports, wherein the plurality of input ports comprise at least one DC input charging port configured to receive power from another EV or another EV charging system;

a plurality of output discharging ports connectable to deliver electrical power to one or more loads, wherein the one or more loads comprise an EV, wherein the plurality of output ports comprise different types of output ports, wherein the plurality of output discharging ports comprise at least one DC output charging port configured to charge the EV and at least one AC output charging port configured to charge the EV;

a plurality of battery packs to receive input electrical power from the plurality of input charging ports and provide output electrical power to the plurality of output discharging ports;

a main control system board connected between the plurality of battery packs and the plurality of inputs, and between the plurality of battery packs and the plurality of outputs, wherein the main control system board controls the plurality of input ports and the plurality of output ports, wherein the main control system monitors input electric power from the plurality of input ports to the battery packs and output electric power from the plurality of output ports to the one or more loads, the main control system board configured to selectively connect each battery pack to any number of the plurality of input ports or any number of the plurality of output ports, each input port to any number of battery packs, and each output port to any number of battery packs, wherein the main control system board is configured to provide a higher voltage for EV charging to the at least one DC output charging port;

a main battery control board for controlling connections between each battery pack and any number of the plurality of input ports or any number of the plurality of output ports, wherein the main control system board controls the main battery control board to separately control charging of the battery packs and discharging of the battery packs;

a switching matrix connected between the plurality of battery packs and the plurality of input charging ports, and between the plurality of battery packs and the plurality of output discharging ports, the switching matrix comprising one or more input switch banks, and one or more output switch banks, one or more charging switch banks, one or more discharging switch banks, and an inter-battery switch bank, wherein the one or more input switch banks control which of the plurality of input charging ports provide the input electrical power to the plurality of battery packs, wherein the one or more output switch banks control which of the plurality of output discharging ports the plurality of battery packs provide the output electrical power to, wherein the one or more charging switch banks control which of the plurality of battery packs are charged from the plurality of input charging ports, wherein the one or more discharging switch banks control which of the plurality of battery discharge to the plurality of output discharging ports, wherein the inter-battery switch bank enables the plurality of battery packs to be connected in series to increase charge voltage or any of the plurality of battery packs to be connected to any other of the plurality of battery packs to charge the other of the plurality of battery packs;

a battery management system board that monitors the battery status of the battery packs, battery modules, battery cells and communicates the data to the main battery control board which controls discharging of the battery packs for charging the loads based on remaining charge in the battery packs and status of the battery packs, battery modules, and battery cells;

wherein the main control system board and the main battery control board control the switching matrix.

2. The system of claim 1 wherein the system is a mobile battery EV charging system.

3. The system of claim 1 wherein the system is a stationary battery EV charging system.

4. The system of claim 3 wherein the system is stationary and fixed at a specific location, such as an EV charging facility, a commercial complex EV charging centre, a residential property, or other location.

5. The system of claim 1 wherein the main control system board controls authentication to use the system, and control usage level depending on the authentication.

6. The system of claim 1 further comprising an electronic device with EV driver application or charger operator application to indicate status of EV charging and status of discharging of the battery packs, battery modules, and battery cells.

7. The system of claim 1 wherein the main battery control board is configured to selectively connect each of the plurality of battery packs to any number of other of the plurality of battery packs.

8. The system of claim 1 wherein the main battery control board communicates with the battery management system board on the battery status by wired or wireless connection.

9. The system of claim 1 wherein each battery pack has its own battery management system in communication with the main control system board, and may be monitored and managed individually by a wired or wireless connection.

10. The system of claim 1 further comprising an additional battery pack to increase the energy storage capacity of the system for improved charging of attached loads.

11. The system of claim 1 wherein the main battery management controller is configured to detect input power characteristics of an active input port, determine one or more selected battery packs to be charged of the plurality of battery packs based on the input power characteristics, and connect the active input port to the one or more selected charging battery packs.

12. The system of claim 1 wherein the main battery management controller is configured to detect load requirements of an active output port, determine one or more selected battery packs to be discharged of the plurality of battery packs based on the load requirements, and connect the active output port to the one or more selected discharging battery packs.

13. The system of claim 1 wherein the main battery management controller is configured to increase output charging voltage by combining the two or more battery packs to increase rate of discharging to the load as long as the load is capable of being charged at an increased rate.

14. The system of claim 1 further comprising a housing containing several input ports such as CCS Types I and 2, CHAdeMo, Tesla, J1772, GB/T, IEC 62196 Type 2, and so on, and output ports such as CCS Types I and 2, CHAdeMo, Tesla, J1772, GB/T, IEC 62196 Type 2, and so on.

15. The system of claim 1 further comprising a display module that may indicate battery status, charging status, and other system parameters.

16. The system of claim 1 further comprising a housing with one or more upgradeable battery pack slots for connecting additional battery packs for increased energy storage.

17. The system of claim 1 wherein the main battery management controller is provided on a main battery management printed circuit board assembly.

18. The system of claim 1 further comprising a status indicator for displaying status information about the inputs, outputs, battery packs, battery modules, and battery cells and wherein the main battery management board comprises an input connection, an output connection, a battery pack connection, and a status indicator connection.

19. The system of claim 1 wherein the main battery management controller is configured to charge multiple loads at the same time as it conducts all operational functions.

20. The system of claim 1 wherein the main battery management controller is configured to control rate, voltage and other parameters of the discharging of the one or more battery packs into each load according to the electric vehicle battery status.

21. The system of claim 1 further comprising an external connection to add an additional battery pack to the system and the plurality of battery packs.

22. The system of claim 1 wherein the at least DC input charging port comprises one or more of CCS Types I and 2, and 2, CHAdeMo, Tesla, J1772, GB/T, IEC 62196 Type 2 or another type of fast EV charging port.

23. A battery electric vehicle (EV) charging system comprising:

a plurality of input ports connectable to receive electrical power from one or more energy sources, wherein the plurality of input ports comprise at least one DC input charging port configured to receive power from another EV or another EV charging system;

a plurality of output ports connectable to deliver electrical power to one or more loads, wherein the one or more loads comprise an EV, wherein the plurality of output ports comprise at least one DC output charging port configured to charge the EV and at least one AC output charging port configured to charge the EV;

a plurality of battery packs internal or external to the system;

a switching matrix connected between the plurality of battery packs and the plurality of inputs, and between the plurality of battery packs and the plurality of outputs, the switching matrix configured to selectively connect each battery pack to any number of the plurality of input ports or any number of the plurality of output ports, each input port to any number of battery packs, and each output port to any number of battery packs, wherein the switching matrix comprises one or more input switch banks, and one or more output switch banks, one or more charging switch banks, one or more discharging switch banks, and an inter-battery switch bank, wherein the one or more input switch banks control which of the plurality of input charging ports provide the input electrical power to the plurality of battery packs, wherein the one or more output switch banks control which of the plurality of output discharging ports the plurality of battery packs provide output electrical power to, wherein the one or more charging switch banks control which of the plurality of battery packs are charged from the plurality of input charging ports, wherein the one or more discharging switch banks control which of the plurality of battery discharge to the plurality of output discharging ports, wherein the inter-battery switch bank enables the plurality of battery packs to be connected in series to increase charge voltage or any of the plurality of battery packs to be connected to any other of the plurality of battery packs to charge the other of the plurality of battery packs;

a main battery management controller operably coupled to the switching matrix for controlling connections between each battery pack and any number of the plurality of input ports or any number of the plurality of output ports, wherein the plurality of battery packs and the main battery management controller provide a higher voltage for EV charging to the at least one DC output charging port;

a management system that monitors: input electric power from the input ports to battery packs; output electric power from the output ports to the one or more loads; and battery status for the battery packs, battery modules, and battery cells;

wherein the management system controls the switching matrix and main battery management controller;

wherein the management system separately controls charging of the battery packs and discharging of the battery packs;

wherein the management system limits discharging of the battery packs for charging the EV based on the remaining charge in the battery packs and status of the battery packs, battery modules, and battery cells.

24. The system of claim 23 wherein the system is a mobile battery EV charging system.

25. The system of claim 23 wherein the system is a stationary battery EV charging system.

26. The system of claim 23 wherein the system is stationary and fixed at a specific location, such as an EV charging facility, a commercial complex EV charging centre, a residential property, or other location.

* * * * *